(12) United States Patent
Konno

(10) Patent No.: US 11,831,975 B2
(45) Date of Patent: Nov. 28, 2023

(54) IMAGING APPARATUS, ELECTRONIC DEVICE, FINDER UNIT

(71) Applicant: CANON KABUSHIKI KAISHA, Tokyo (JP)

(72) Inventor: Yoshihiko Konno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/725,343

(22) Filed: Apr. 20, 2022

(65) Prior Publication Data

US 2022/0247933 A1 Aug. 4, 2022

Related U.S. Application Data

(63) Continuation of application No. PCT/JP2020/040662, filed on Oct. 29, 2020.

(30) Foreign Application Priority Data

Oct. 31, 2019 (JP) .................................. 2019-199104
Oct. 20, 2020 (JP) .................................. 2020-176363

(51) Int. Cl.
*H04N 23/63* (2023.01)
*H04N 23/55* (2023.01)
*H04N 23/71* (2023.01)
*H04N 23/74* (2023.01)

(52) U.S. Cl.
CPC ............. *H04N 23/63* (2023.01); *H04N 23/55* (2023.01); *H04N 23/71* (2023.01); *H04N 23/74* (2023.01)

(58) Field of Classification Search
CPC ...................................................... H04N 23/63
USPC ................................................... 348/207.99
See application file for complete search history.

(56) References Cited

U.S. PATENT DOCUMENTS 5,761,543 A * 6/1998 Yamada ................. G03B 13/02
396/51

FOREIGN PATENT DOCUMENTS

| JP | H05130463 A | 5/1993 |
|---|---|---|
| JP | H06138369 A | 5/1994 |
| JP | H07191382 A | 7/1995 |
| JP | H07299038 A | 11/1995 |
| JP | 3186072 B2 | 7/2001 |

* cited by examiner

*Primary Examiner* — Joel W Fosselman
(74) *Attorney, Agent, or Firm* — Canon U.S.A., Inc. I.P. Division

(57) ABSTRACT

An imaging apparatus including a first sensor configured to image an optical subject image incident via a first lens unit includes a display panel, an eyepiece portion, a second sensor configured to image an eye of a user viewing the display panel by looking into the eyepiece portion, the second sensor being different from the first sensor, an optical path split unit configured to guide light from the display panel to outside the imaging apparatus and to guide external light to the second sensor, and a second lens unit disposed between the optical path split unit and the eyepiece portion, wherein the second sensor is disposed at a different side from a side where a grip region of the imaging apparatus is disposed with respect to an optical axis of the second lens unit.

16 Claims, 26 Drawing Sheets

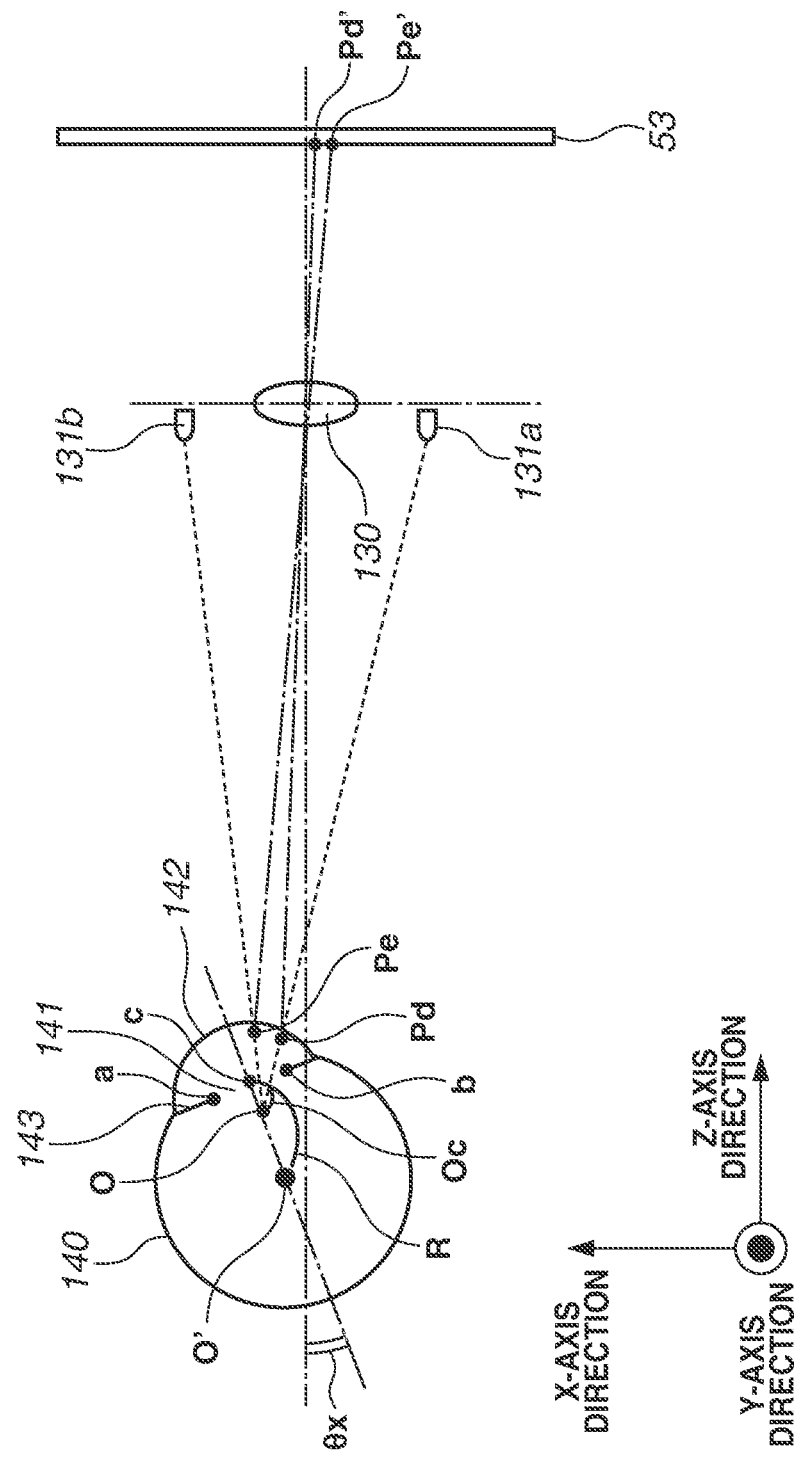

IMAGING APPARATUS, ELECTRONIC DEVICE, FINDER UNIT

CROSS-REFERENCE TO RELATED APPLICATIONS

This application is a Continuation of International Patent Application No. PCT/JP2020/040662, filed Oct. 29, 2020, which claims the benefit of Japanese Patent Application No. 2019-199104, filed Oct. 31, 2019, and Japanese Patent Application No. 2020-176363, filed Oct. 20, 2020, all of which are hereby incorporated by reference herein in their entirety.

BACKGROUND OF THE INVENTION

Field of the Invention

The present invention relates to an imaging apparatus with a line-of-sight detection function, an electronic device, and a finder unit.

Background Art

Electronic viewfinders (EVFs) have been known as display devices of digital cameras. A user moves an eye of the user close to an EVF to view a display image.

Further, cameras and video cameras with a line-of-sight detection function that realize a function of selecting autofocus points by detecting a line-of-sight direction of a user have been put to practical use.

For example, J PTL1 discusses a technique that uses a common optical path as both an optical path of an electronic viewfinders (EVF) display and an optical path of a line-of-sight input sensor and provides an optical path split mirror on the common optical path to detect a line-of-sight direction (position) of an eye that views the EVF display.

However, PTL1 does not discuss an optical arrangement of an electronic viewfinder (EVF) in an imaging apparatus with a line-of-sight input function. For example, a suitable structure for preventing an effect of dust in a finder and a relative arrangement of an operation member and a built-in member of an imaging apparatus and a finder and a line-of-sight detection mechanism are not considered.

CITATION LIST

Patent Literature

PTL1: Japanese Patent Application Laid-Open No. 5-130463

SUMMARY OF THE INVENTION

The present invention is directed to a suitable EVF arrangement in an imaging apparatus including an EVF and a line-of-sight input function that prevents a decrease in operability of the imaging apparatus.

According to an aspect of the present invention, in order to achieve the above-described object, a display unit (19) including a display unit (18) is fixed to an optical path split unit (16) configured to split an optical path to a line-of-sight detection sensor in an electronic viewfinder (EVF) having a line-of-sight detection function.

Further features of the present invention will become apparent from the following description of exemplary embodiments with reference to the attached drawings.

BRIEF DESCRIPTION OF THE DRAWINGS

FIG. 18 is a diagram illustrating a principle of a line-of-sight detection method.

DESCRIPTION OF THE EMBODIMENTS

First Exemplary Embodiment

Various exemplary embodiments of the present invention will be described below with reference to the attached drawings.

<Basic Structure of Imaging Apparatus 100>

Figure 1A:
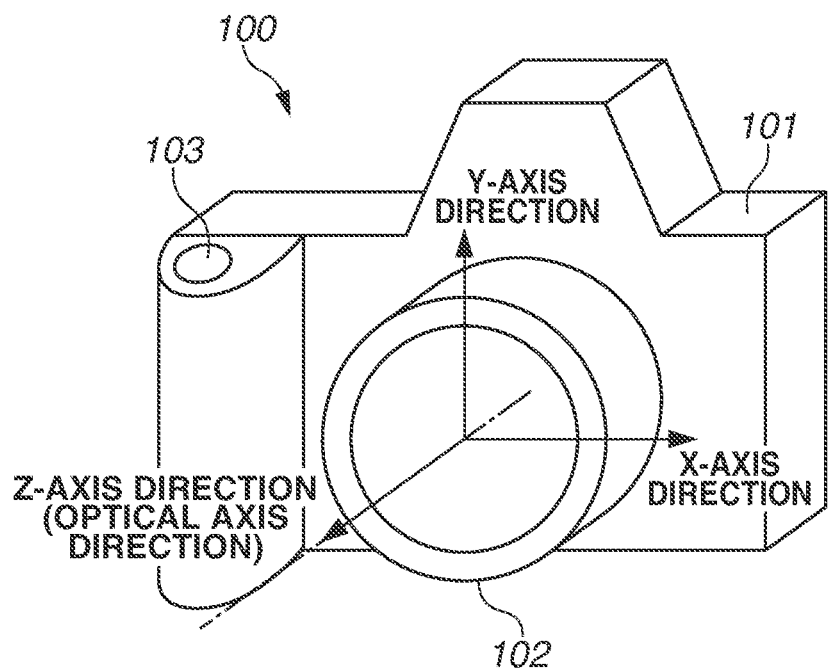
FIG. 1A is a diagram illustratively illustrating an exterior view of a camera body 101 as an electronic device according to a first exemplary embodiment of the present invention.
Figure 1B:
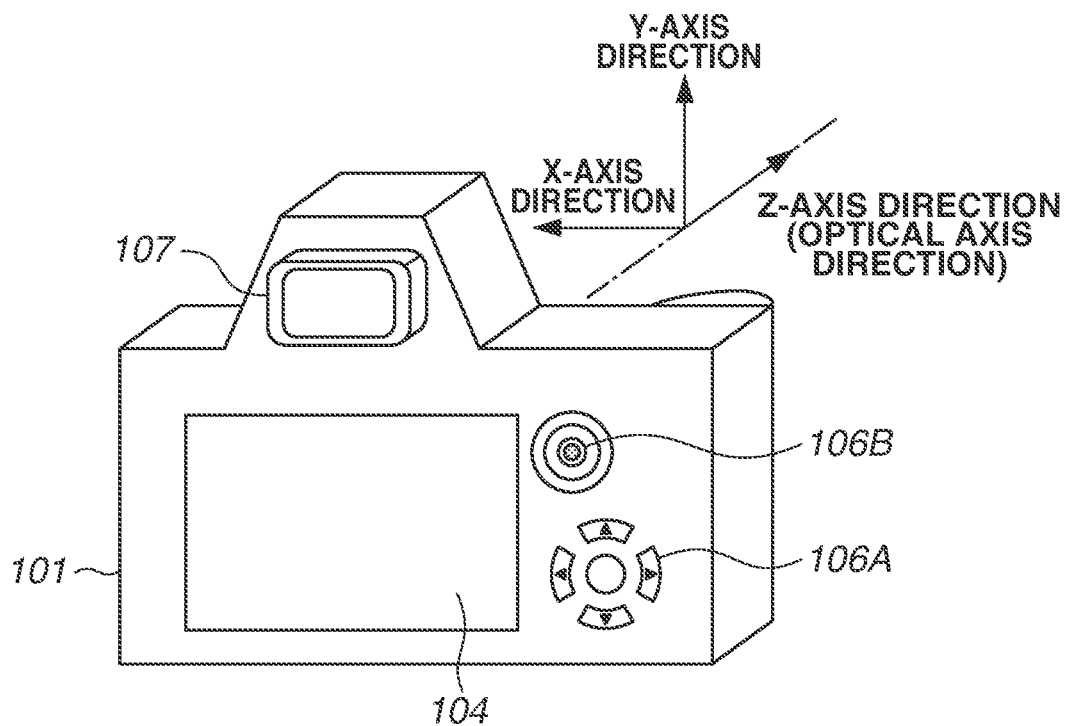
FIG. 1B is a diagram illustratively illustrating an exterior view of the camera body 101 as an electronic device according to the first exemplary embodiment of the present invention.

FIGS. 1A and 1B are diagrams illustratively illustrating external views of a camera body 101 as an electronic device according to a first exemplary embodiment of the present invention. According to the present exemplary embodiment, the camera body 101 and a lens unit 102 described below will collectively be referred to as an imaging apparatus 100. Further, an electronic device according to an aspect of the present invention is applicable to any electronic devices capable of detecting a device displaying information, such as images and characters, and a line of sight of a user viewing the information displayed on the device. Examples of the electronic devices may include mobile phones, game machines, tablet terminals, personal computers, watch- or glasses-type information terminals, and head-mount displays.

FIG. 1A is a front perspective view, and FIG. 1B is a rear perspective view. The camera body 101 includes a release button 103 disposed thereon. The release button 103 is an operation member for receiving an imaging operation from a user (image capturing person). As illustrated in FIG. 1B, an eyepiece portion 107 is disposed on a rear side of the camera body 101, and the user can look into an electronic viewfinder (EVF) unit 1 included in the camera body 101 through the eyepiece portion 107. The eyepiece portion 107 forms an eyehole and is externally protruded (directed behind) from the camera body 101. An operation member 106 is also disposed on the rear side of the camera body 101. The operation member 106 receives various operations from the user. For example, a first operation member 106A is an operation lever that can be pressed in each direction. A second operation member 106B is a four-direction key that can be pressed in four directions. A display monitor 104 (touch panel) includes a display panel, such as a liquid crystal panel, and has a function of displaying images on the display panel.

Figure 2:
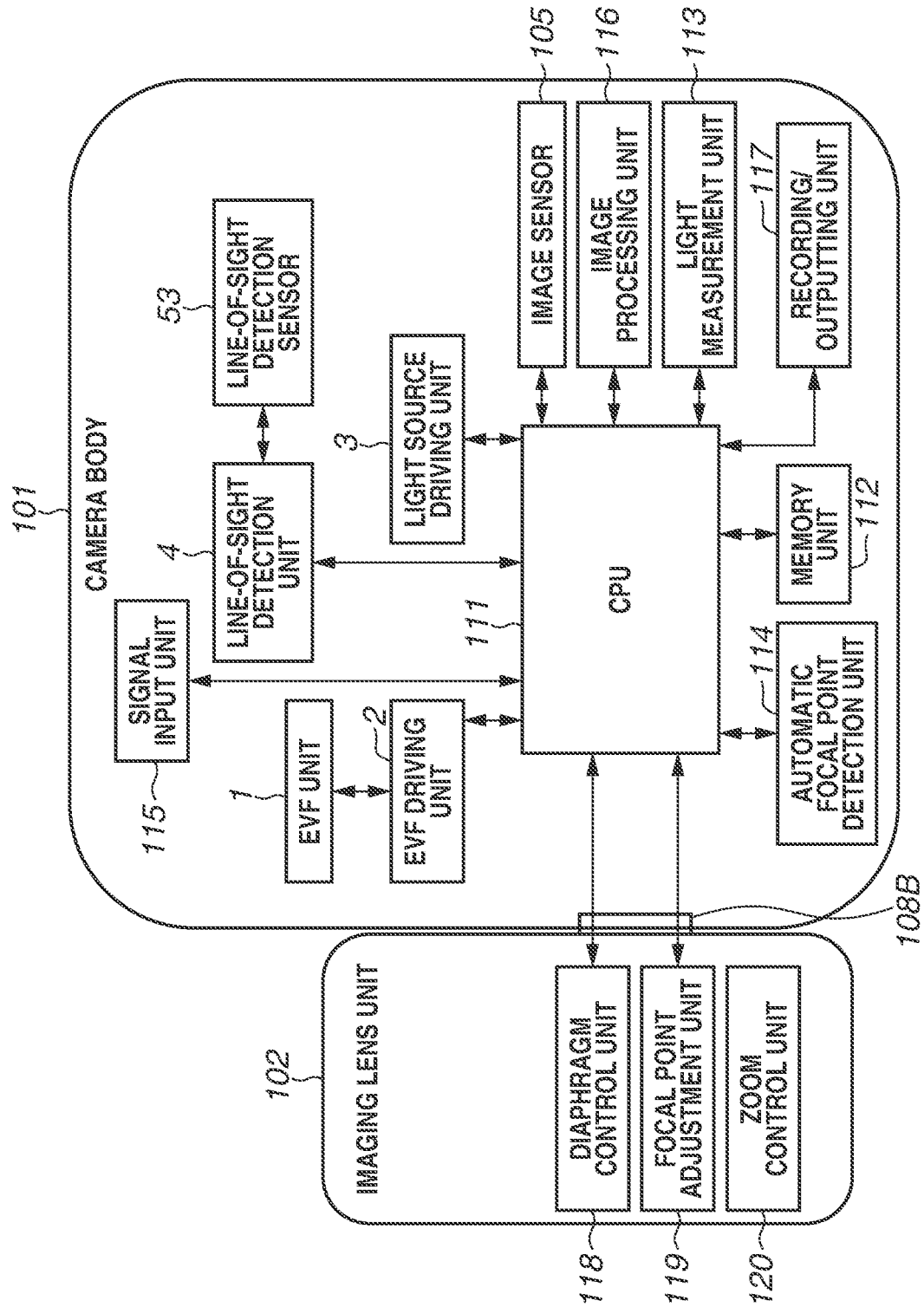
FIG. 2 is a block diagram illustratively illustrating an internal configuration of the camera body 101 according to an aspect of the present invention.

FIG. 2 is a block diagram illustratively illustrating an internal configuration of the camera body 101 according to an aspect of the present invention. An image sensor 105 is an image sensor, such as a charge-coupled device (CCD) sensor or complementary metal oxide semiconductor (CMOS) sensor. An optical image formed on an image plane of the image sensor 105 by an optical system of the lens unit 102 is photoelectrically converted by the image sensor 105 to obtain an analog image signal, the obtained analog image signal is output to an analog/digital (A/D) conversion unit, and image data is output from the AD conversion unit.

The lens unit 102 consists of the optical system including a zoom lens (not illustrated), a focus lens (not illustrated), and a diaphragm (not illustrated). Mounted on the camera body 101, the lens unit 102 guides light beams from a subject to the image sensor 105 and forms a subject image on the image plane of the image sensor 105. A diaphragm control unit 118, a focal point adjustment unit 119, and a zoom control unit 120 each receive instruction signals from a central processing unit (CPU) 111 via a mount contact portion 108B provided on a mount portion 108A and controls driving of the diaphragm, the focus lens, and the zoom lens based on the instruction signals.

The CPU 111 as a control unit of the camera body 101 reads a control program for blocks included in the camera body 101 from a read-only memory (ROM) of a memory unit 112, develops the read program to a random access memory (RAM) of the memory unit 112, and executes the developed program. By doing so, the CPU 111 controls operations of the blocks of the camera body 101 and comprehensively controls the camera body 101 and the lens unit 102. A line-of-sight detection unit 4, a light measurement unit 113, an automatic focal point detection unit 114, a signal input unit 115, an EVF driving unit 2, and a light source driving unit 3 are connected to the CPU 111. Further, the CPU 111 transmits signals to the focal point adjustment unit 119 and the diaphragm control unit 118 disposed in the lens unit 102 via the mount contact portion 108B. According to the present exemplary embodiment, the memory unit 112 has a function of storing imaged signals from the image sensor 105 and a line-of-sight detection sensor 53.

With an eyeball image formed on the line-of-sight detection sensor 53 (CCD-EYE) described below, the line-of-sight detection unit 4 performs A/D conversion on the output (eye image obtained by imaging an eye) from the line-of-sight detection sensor 53 and acquires a result of the A/D conversion. The CPU 111 extracts feature points necessary for line-of-sight detection from the eye image according to a predetermined algorithm described below and calculates a line of sight (gaze point on an image for viewing) of the user from positions of the feature points.

The light measurement unit 113 performs amplification, logarithmic compression, and A/D conversion on signals, which are acquired from the image sensor 105 serving also as a light measurement sensor, specifically luminance signals corresponding to the brightness of a field, and acquires a result as field luminance information.

The automatic focal point detection unit 114 performs A/D conversion on signal voltages from a plurality of detection elements (plurality of pixels) that is included in pixels of the image sensor 105 and is used for phase difference detection. The CPU 111 then calculates a distance to a subject corresponding to a focal point detection point based on the converted signals of the plurality of detection elements. This is a publicly-known technique known as image plane phase difference autofocusing (image plane phase difference AF). According to the present exemplary embodiment, for example, a field image (image for viewing) in the finder is split, and 180 split portions on the image plane each include a focal point detection point.

An image processing unit 116 performs various types of image processing on image data stored in the RAM. Specifically, the image processing unit 116 applies various types of image processing for developing digital image data and displaying and recording the developed digital image data. Examples of the various types of image processing include correction processing for correcting pixel defects originating from an optical system or an image sensor, demosaicing processing, white balance correction processing, color interpolation processing, and gamma processing.

Switches SW1 and SW2 are connected to the signal input unit 115. The switch SW1 is turned on by a first stroke of the release button 103, and the switch SW2 is turned on by a second stroke of the release button 103. An instruction to start a light measurement, distance measurement, or line-of-sight detection operation of the camera body 101 is issued with the switch SW1, and an instruction to start an imaging operation is issued with the switch SW2. ON signals from the switches SW1 and SW2 are input to the signal input unit 115 and transmitted to the CPU 111. The signal input unit 115 also receives operation input from the operation members 106A and 106B and the display monitor 104 illustrated in FIG. 1B.

A recording/outputting unit 117 records data including image data in a recording medium such as a removable memory card, or such data is output to external devices via an external interface. A basic structure of the imaging apparatus 100 including the camera body 101 and the lens unit 102 has been described above.

<Structure of EVF Unit 1>

Figure 3:
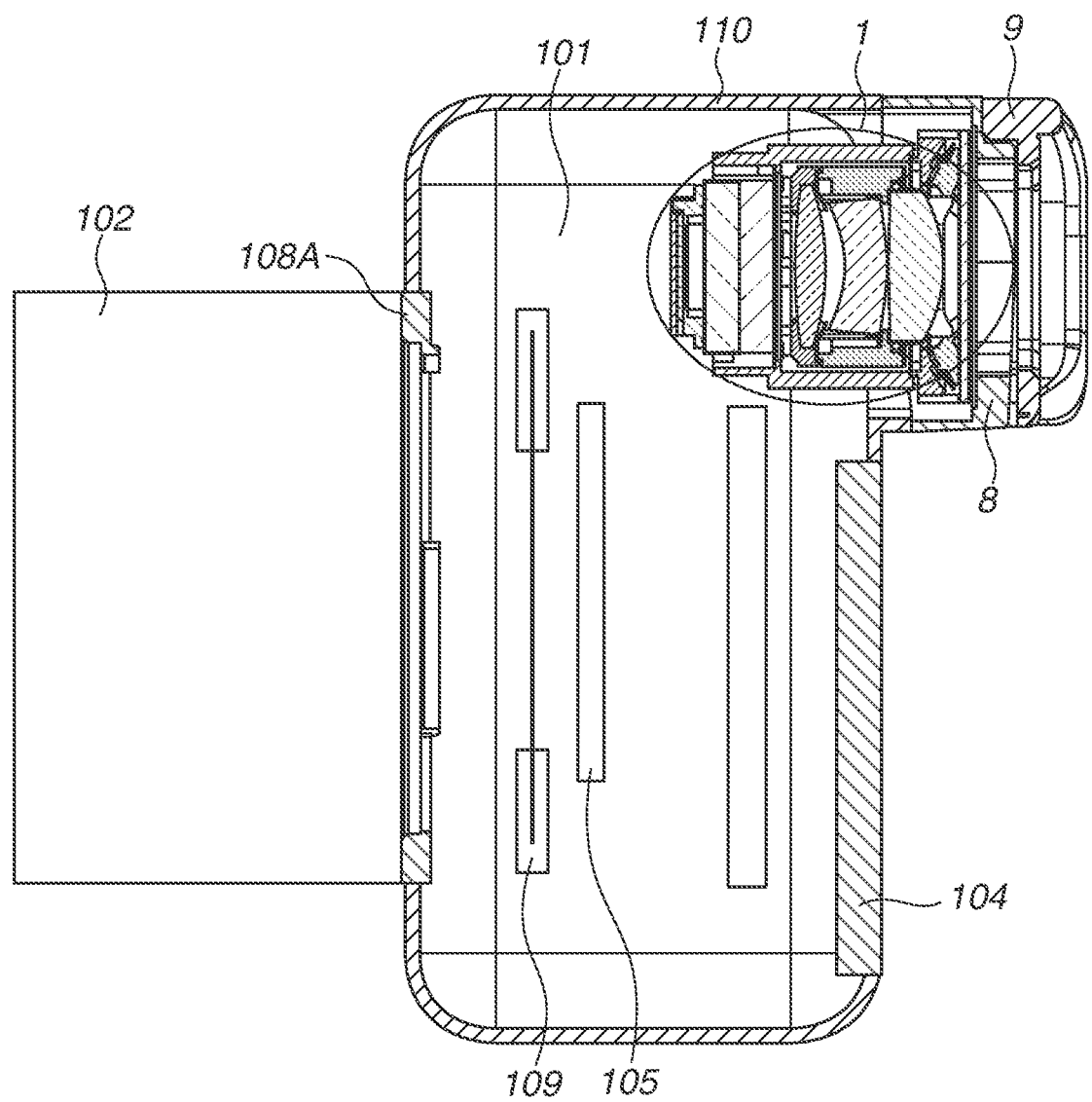
FIG. 3 is a cross-sectional view illustrating the camera body 101 according to the first exemplary embodiment of the present invention.

FIG. 3 is a cross-sectional view illustrating the camera body 101 according to the first exemplary embodiment of the present invention and is a cross section cut along a YZ-plane formed by Y- and Z-axes illustrated in FIG. 1A.

As illustrated in FIG. 3, a shutter 109 is a focal-plane mechanical shutter, and the shutter 109 and the image sensor 105 are arranged in this order from the side where the lens unit 102 is disposed. In the cross-sectional view illustrated in FIG. 3, a main substrate (not illustrated) is provided between the image sensor 105 and the display monitor 104. The lens unit 102 is attachable to and detachable from the camera body 101 via the mount portion 108A. In a state illustrated in FIG. 3, the lens unit 102 is mounted on the camera body 101.

The EVF unit 1 is a display unit provided at an upper portion of the camera body 101 and has a line-of-sight detection function described below. The upper portion of the camera body 101 is a side where the EVF unit 1 is provided inside an exterior cover 110, whereas a lower portion of the camera body 101 is a side where not the EVF unit 1 but the display monitor 104 and the image sensor 105 are provided.

The EVF unit (finder unit) 1 can display menus and images as a typical EVF similarly to the display monitor 104 and, furthermore, has the line-of-sight detection function of detecting a line of sight of the user looking into the EVF unit 1. Further, the EVF unit 1 is configured to reflect line-of-sight detection results in the control of the camera body 101. Details of the line-of-sight detection function will be described below.

The user can look into the EVF unit 1 through the eyepiece portion 107 including an eyecup 9, which is removable, attached to an eyecup attachment frame 8.

Figure 4:
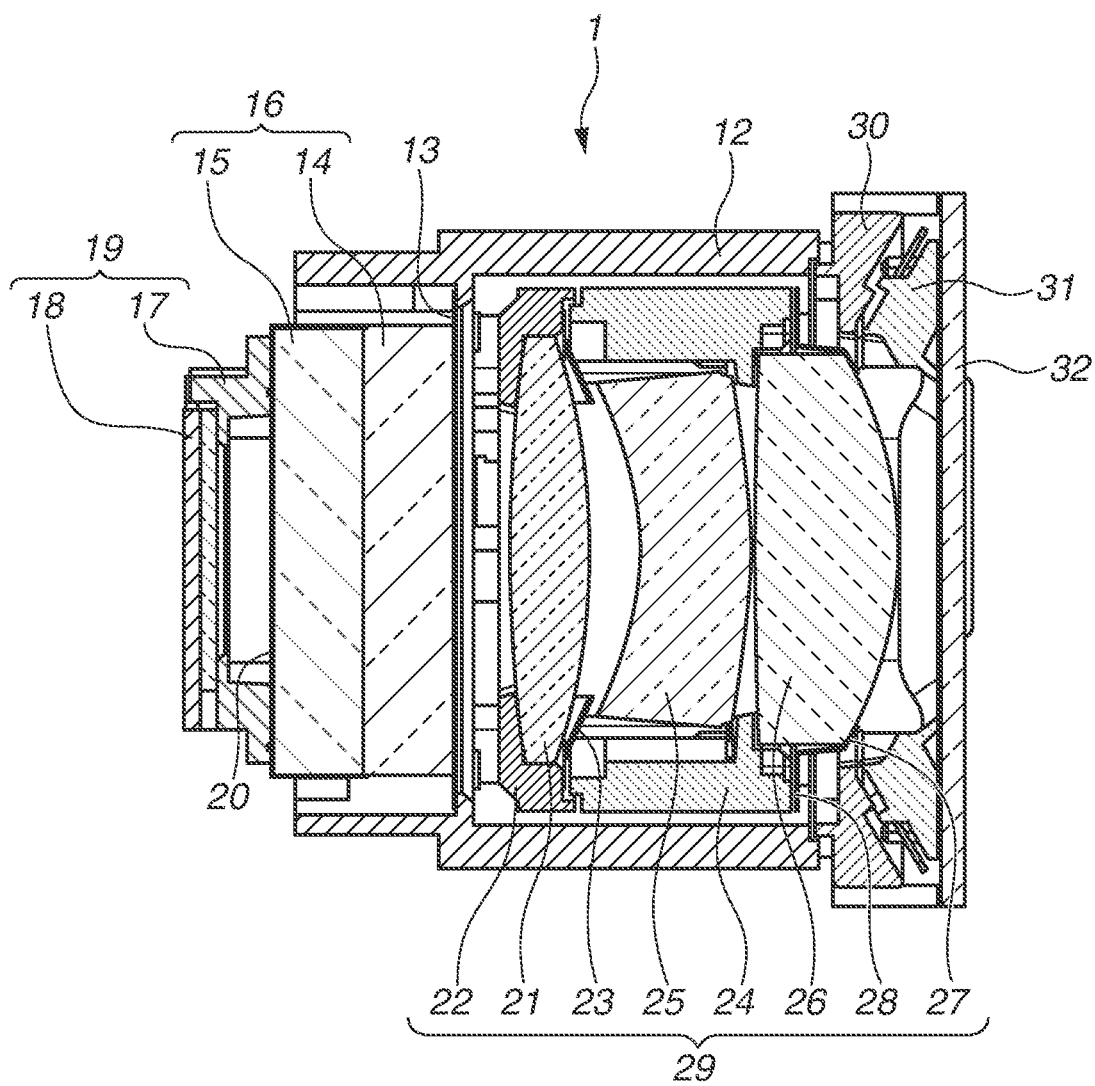
FIG. 4 is a cross-sectional view illustrating an electronic viewfinder (EVF) unit 1 according to the first exemplary embodiment of the present invention.

Details of the structure of the EVF unit 1 will now be described with reference to FIG. 4. FIG. 4 is a cross-sectional view illustrating the EVF unit 1 according to the first exemplary embodiment of the present invention and illustrates a longitudinal cross section with respect to an optical axis of the EVF unit 1 (i.e., an imaging optical axis of an EVF lens unit 29). The position of the EVF lens unit 29 illustrated in FIG. 4 indicates a case where a diopter is −1.

An optical path split prism unit 16 is bonded and fixed to a fixed lens-barrel 12 with a prism mask 13 therebetween.

The optical path split prism unit 16 is an optical path split unit including a first optical path split prism 14 and a second optical path split prism 15 bonded together.

A panel holder 17 is a holding mechanism for holding the display panel 18. A display panel 18 and the panel holder 17 are bonded together and fixed to form a display panel unit 19 of the EVF unit 1.

The display panel unit 19 and the optical path split prism unit 16 are fixed with a panel mask 20 therebetween. The panel mask 20 is a mask unit.

The EVF lens unit (eyepiece optical system) 29 of the EVF unit 1 includes a G1 lens 21, a G2 lens 25, and a finder lens (G3 lens) 26. The G1 lens 21 is held by a G1 lens holder 22. Further, a G1-G2 mask 23 is also held by the G1 lens holder 22. A G2-G3 holder 24 holds the G2 lens 25 and the G3 lens as the finder lens 26. The G1 lens holder 22 is fixed to the G2-G3 holder 24 with screws (not illustrated). A G3 mask 27 is fixed to the G2-G3 holder 24 with a double-sided masking tape 28. The foregoing members 21 to 28 will collectively be referred to as the EVF lens unit 29.

Figure 5:
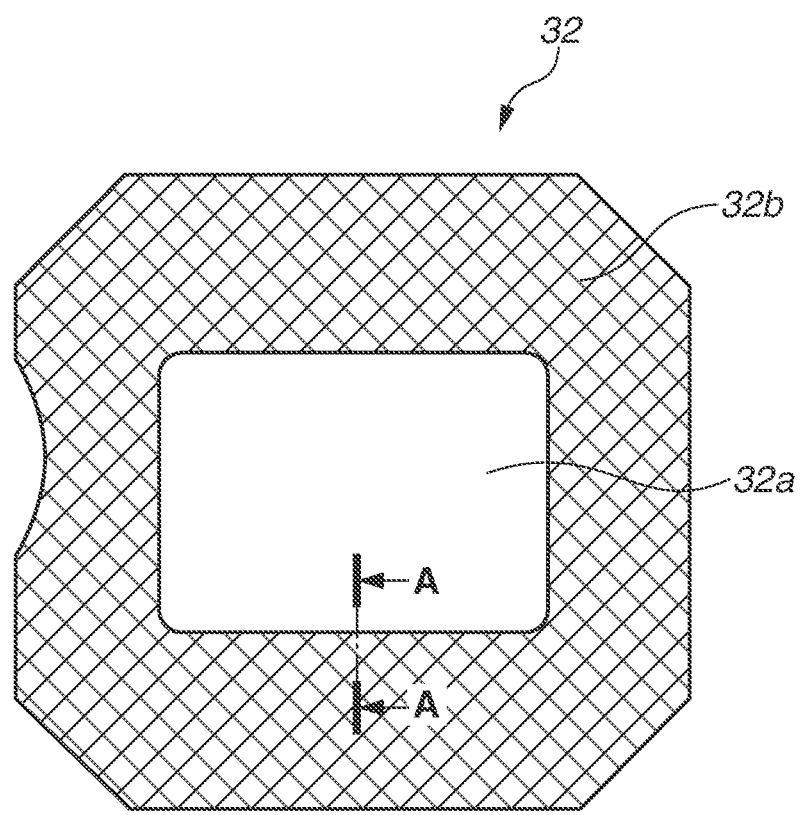
FIG. 5 is a diagram illustratively illustrating an eyepiece window 32 according to the first exemplary embodiment of the present invention.

In the eyepiece portion 107 of the EVF unit 1, a light emitting diode (LED) holder 30, an eyepiece window holder 31, and an eyepiece window 32 are provided. Next, details of a structure of the eyepiece window 32 will be described with reference to FIG. 5. FIG. 5 is a diagram illustratively illustrating the eyepiece window 32 according to the first exemplary embodiment of the present invention and illustrates the eyepiece window 32 viewed from the EVF lens unit 29 side (inside of the camera).

The eyepiece window 32 is an optical member having R1 and R2 surfaces. The R1 surface is on a side facing the inside of the camera, and the R2 surface is on the opposite side (outside the camera). A base material of the eyepiece window 32 is a transparent plate glass. A transparent region 32a is a blank region, and a visible light cut mask 32b illustrated as a cross-hatched region surrounds the transparent region 32a. Specifically, the transparent region 32a is located at a portion corresponding to an imaging optical path of the EVF unit 1, and the visible light cut mask 32b is disposed at a region to avoid the imaging optical path.

The visible light cut mask 32b is a printed material printed with a material (ink) that absorbs visible light and transmits infrared light. A color of an appearance of the visible light cut mask 32b is black under visible wavelength light. The visible light cut mask 32b may be configured to have a lower visible wavelength light transmittance than an infrared wavelength light transmittance.

Figure 6:
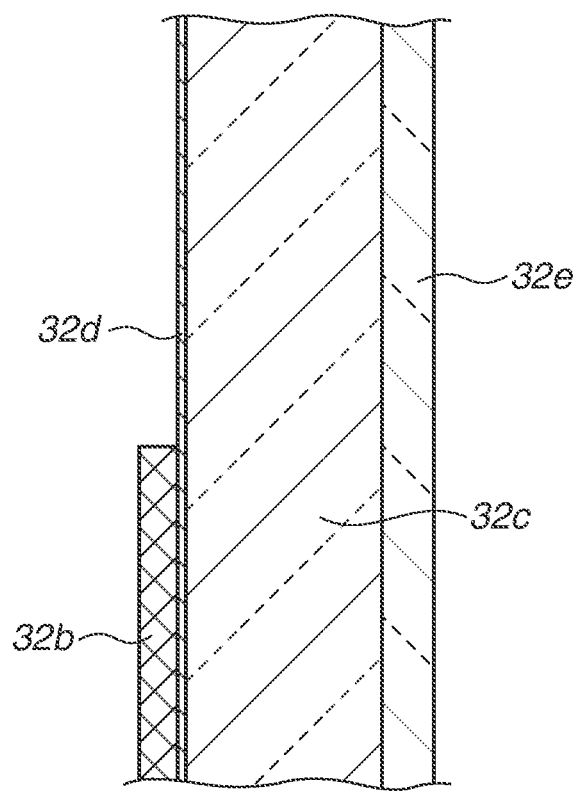
FIG. 6 is a cross-sectional view illustrating the eyepiece window 32 according to an aspect of the present invention.

FIG. 6 is a cross-sectional view illustrating the eyepiece window 32 according to an aspect of the present invention along a cross section A-A illustrated in FIG. 5. As described above, a plate glass 32c is the base material of the eyepiece window 32. An antireflection coat 32d is a coating disposed on a side of the eyepiece window 32 that faces the inside of the camera. The antireflection coat 32d prevents reflection of unnecessary light. Furthermore, an antireflection (AR) film 32e is provided on the opposite side to the antireflection coat 32d across the plate glass 32c. The AR film 32e has a function of a hard coat, an antireflection coat, and anti-scattering. With the AR film 32e having the anti-scattering function on the side of the eyepiece window 32 that faces the outside of the camera, safety is improved in a situation where the eyepiece window 32 is damaged.

As described above, the user can observe display images displayed on the display panel unit 19 through the optical path split prism unit 16, the EVF lens unit 29, and the transparent region 32a of the eyepiece window 32.

Figure 7:
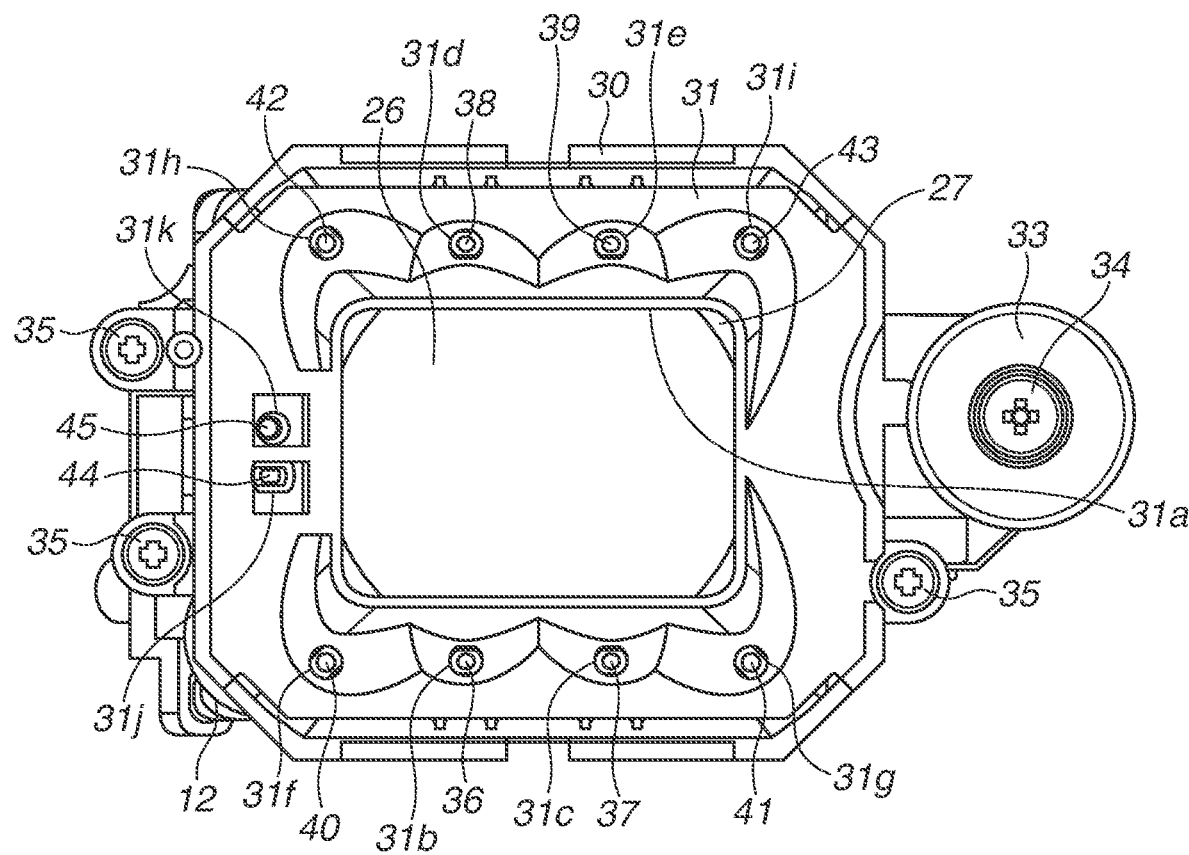
FIG. 7 is a diagram illustrating a structure of the EVF unit 1 according to an aspect of the present invention.

Next, FIG. 7 is a diagram illustrating a structure of the EVF unit 1 viewed from the eyepiece portion 107 side with the eyepiece window 32 removed. Specifically, FIG. 7 is a diagram illustrating details of the EVF unit 1 in a case where the camera body 101 is viewed from the rear side.

As illustrated in FIG. 7, a display opening mask 31a is provided at a center of the eyepiece window holder 31. The display opening mask 31a is horizontally long correspondingly to an aspect ratio of the EVF unit 1 and has substantially the same shape as the transparent region 32a of the eyepiece window 32.

A diopter adjustment dial 33 is rotatably held on a side surface (right side surface) of the EVF unit 1 with a shaft screw 34. The diopter adjustment dial 33 is a diopter adjustment unit that moves a lens group of the EVF lens unit 29 in a direction parallel to the optical axis to adjust a diopter when the user looks into the EVF unit 1. A right side of the camera body 101 is the side where the release button 103, the first operation member 106A, and the second operation member 106B are located in a direction parallel to an X-axis direction illustrated in FIG. 1A.

Fixing screws 35 fix the eyepiece window holder 31 and the LED holder 30 together to the fixed lens-barrel 12.

Infrared LEDs 36, 37, 38, and 39 for line of sight are illumination units for line of sight mainly for short-range illumination and are respectively disposed in opening masks 31b, 31c, 31d, and 31e for LEDs of the eyepiece window holder 31.

Infrared LEDs 40, 41, 42, and 43 for line of sight are illumination units for line of sight mainly for long-range illumination and are respectively disposed in opening masks 31f, 31g, 31h, and 31i for LEDs of the eyepiece window holder 31. The foregoing eight infrared LEDs for line of sight are disposed such that illumination light beams are narrowed by the opening masks for LEDs to emit infrared light toward different positions (emission directions).

An infrared LED 44 for proximity detection is an illumination unit of a proximity detection unit that detects an approach of an object (mainly the user) to the EVF unit 1 together with a sensor 45 for proximity detection, which will be described below. The infrared LED 44 for proximity detection is disposed in an opening mask 31j for LEDs.

The sensor 45 for proximity detection is a detection unit that receives light beams emitted from the infrared LED 44 for proximity detection in the predetermined emission direction and reflected via an object. The sensor 45 for proximity detection is disposed in an opening mask 31k for sensors.

As illustrated in FIG. 7, the four infrared LEDs 36, 37, 38, and 39 for line of sight are disposed at positions along the upper long side of the display opening mask 31a, and the other four infrared LEDs 40, 41, 42, and 43 for line of sight (eight infrared LEDs for line of sight in total) are disposed at positions along the lower long side of the display opening mask 31a. The infrared LED 44 for proximity detection, the sensor 45 for proximity detection, and the diopter adjustment mechanism are disposed at positions along the shorter sides of the display opening mask 31a. With such a structure, the size of the EVF unit 1 on a two-dimensional projection plane can be reduced while the line-of-sight detection function and the diopter adjustment function are included.

Figure 8:
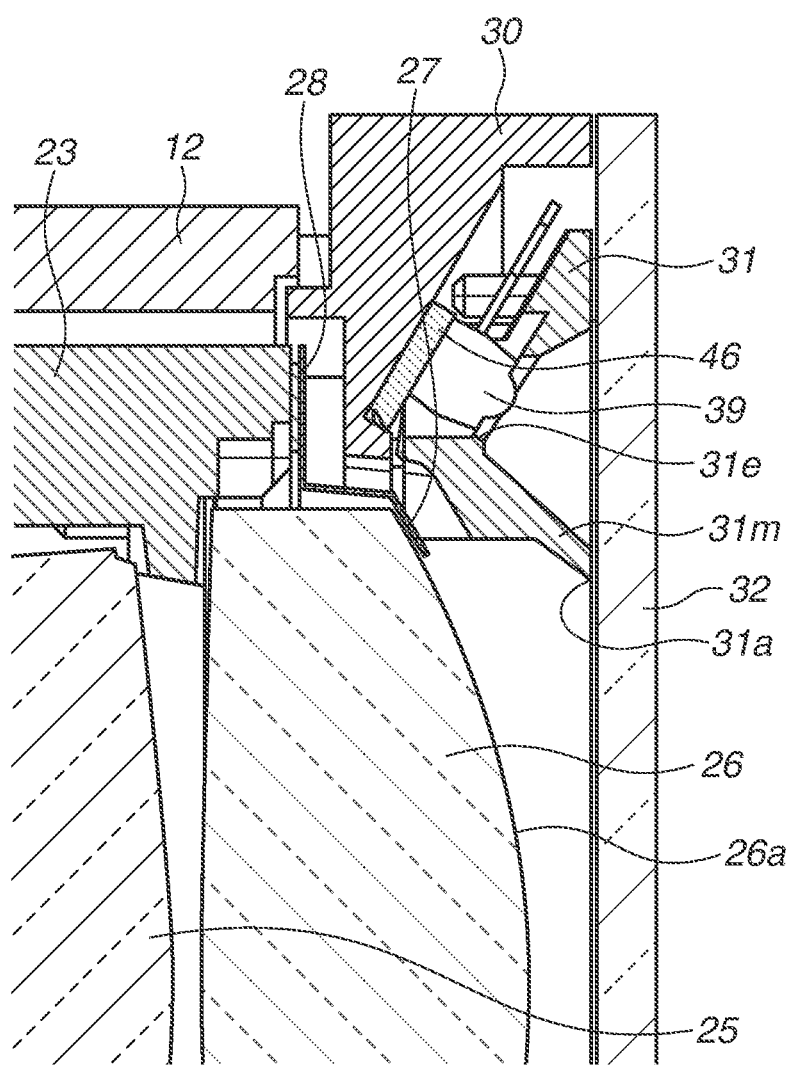
FIG. 8 is a cross-sectional view illustrating a main portion of the EVF unit 1 according to an aspect of the present invention.

Further, as illustrated in FIG. 7, the eight infrared LEDs 36 to 39, and 40 to 43 for line of sight, the infrared LED 44 for proximity detection, and the sensor 45 for proximity detection are disposed outside the display opening mask 31a with respect to the optical axis of the EVF unit 1. Thus, the illumination units and the detection units are disposed at (overlap on the two-dimensional projection plane) a region where the visible light cut mask 32b of the eyepiece window 32 is located in a case where the EVF unit 1 is viewed from the rear side of the camera body 101, so that the illumination units and the detection units are not easily visible from the user. With such a structure, the illumination units and the detection units are invisible from the outside. FIG. 8 is a cross-sectional view illustrating a main portion of the EVF unit 1 and illustrates a longitudinal cross section at a position including the infrared LED 39 for line of sight mainly for short-range illumination in the direction parallel to the optical axis of the EVF unit 1. The state illustrated in FIG. 8 indicates a case where the diopter of the EVF unit 1 is +2.0 as the position of the EVF lens unit 29.

As illustrated in FIG. 8, the infrared LED 39 for line of sight for short-range illumination is pressed against the eyepiece window holder 31 by a cushion member 46 attached to the LED holder 30 and is fixed to the opening mask 31e for LEDs.

A light-shielding wall 31m is a light-shielding member that prevents infrared light emitted from the infrared LED 39 for line of sight for short-range illumination from directly entering the finder lens 26.

The finder lens 26 includes an R2 surface 26a. The R2 surface 26a is a convex lens, and a space between the finder lens 26 and the eyepiece window 32 increases at great distances from a lens center toward peripheries. Since the light-shielding wall 31m is disposed in the increased region, illumination light from the infrared LED 39 for line of sight for short-range illumination can illuminate even a region at a short distance from the eyepiece window 32, for example.

Furthermore, since the eyepiece window 32 includes the visible light cut mask 32b and the transparent region 32a as a single continuous member, there is no need for a separate connection portion for connecting the visible light cut mask 32b and the transparent region 32a together. Thus, vignetting of light beams in a connection portion does not occur, and light distribution characteristics of the EVF unit 1 to nearby regions improve.

While the infrared LED 39 for line of sight is mainly described above, the infrared LEDs 36, 37, and 38 for line of sight and the infrared LEDs 40, 41, 42, and 43 for line of sight have a similar structure and produce the above-described advantages.

Next, details of the relative arrangement of the infrared LED 44 for proximity detection and the sensor 45 for proximity detection will be described. According to the present exemplary embodiment, the infrared LED 44 for proximity detection and the sensor 45 for proximity detection are packaged into a single unit as a proximity detection unit 47.

Figure 9:
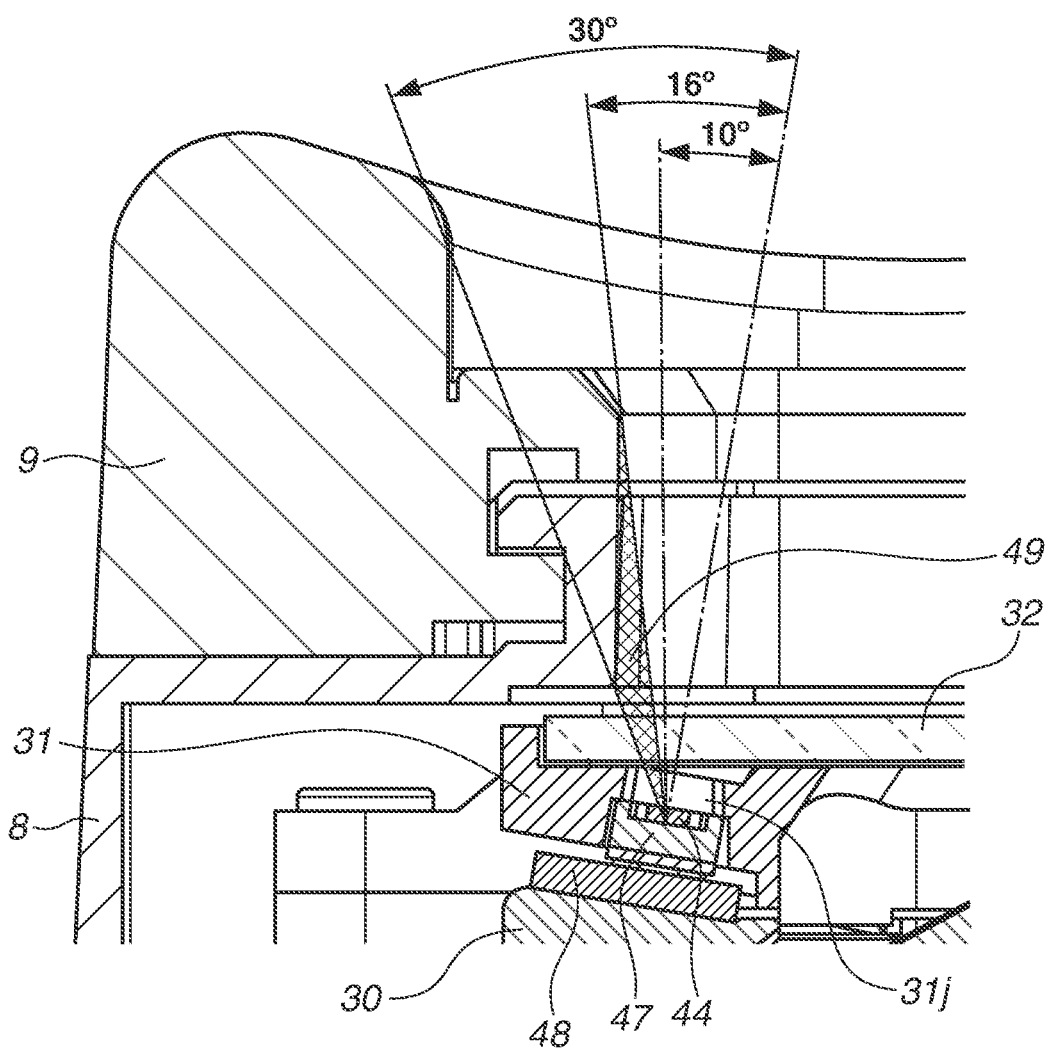
FIG. 9 is a cross-sectional (horizontal sectional) view illustrating a main portion of the EVF unit 1 at a position including an infrared light emitting diode (LED) 44 for proximity detection according to the first exemplary embodiment of the present invention.
Figure 10:
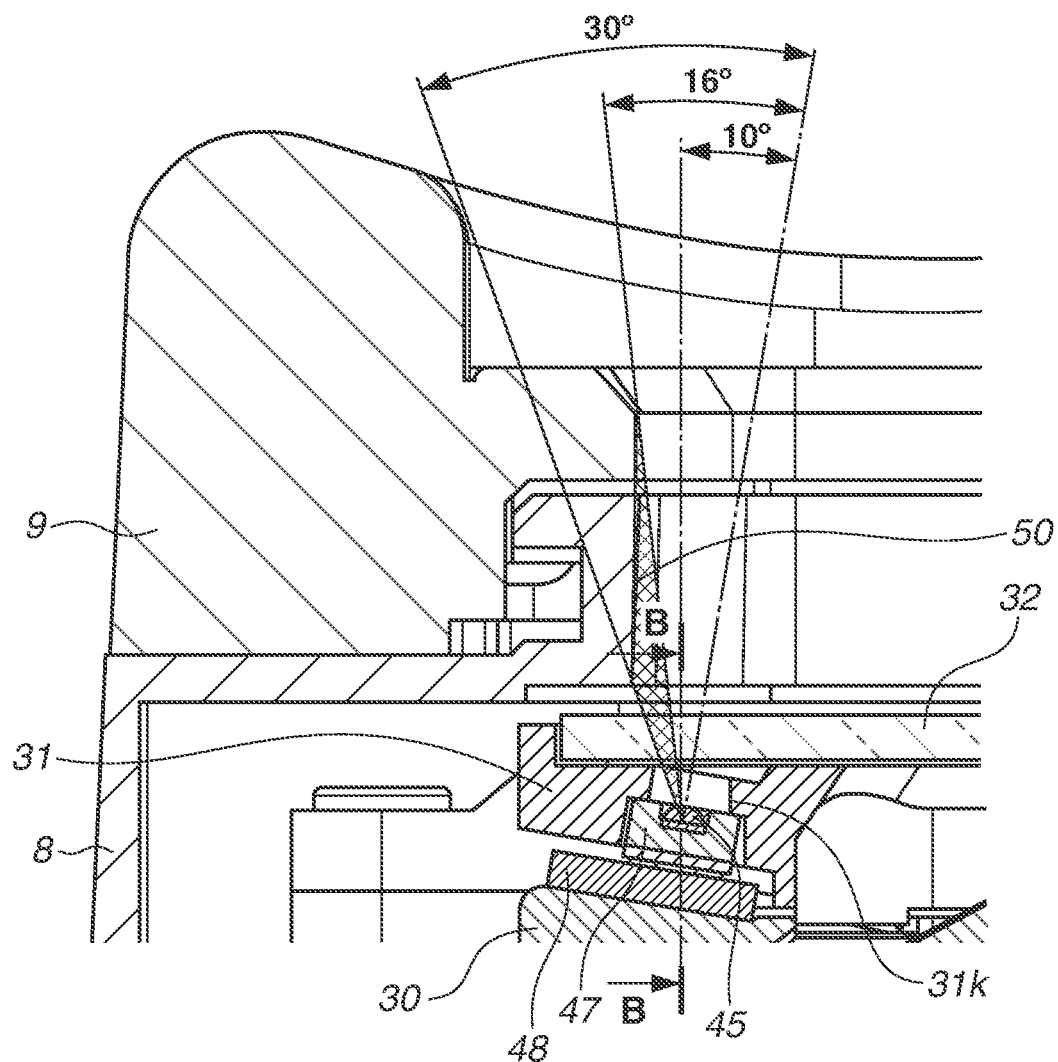
FIG. 10 is a cross-sectional (horizontal sectional) view illustrating a main portion of the EVF unit 1 at a position including a sensor 45 for proximity detection according to the first exemplary embodiment of the present invention.

FIG. 9 is a cross-sectional (horizontal sectional) view illustrating a main portion of the EVF unit 1 at a position including the infrared LED 44 for proximity detection according to the first exemplary embodiment of the present invention. FIG. 10 is a cross-sectional (horizontal sectional)

view illustrating a main portion of the EVF unit 1 at a position including the sensor 45 for proximity detection according to the first exemplary embodiment of the present invention.

The positions of the infrared LED 44 for proximity detection and the sensor 45 for proximity detection as the proximity detection unit 47 in the EVF unit 1 are determined. Specifically, the proximity detection unit 47 is pressed against the eyepiece window holder 31 via a second cushion member 48 to determine the position of the proximity detection unit 47 in the EVF unit 1. As illustrated in FIG. 9, the proximity detection unit 47 is disposed such that an illumination surface of the infrared LED 44 for proximity detection is inclined at an angle of 10 degrees with respect to a line parallel to the optical axis of the EVF unit 1.

Similarly, a sensor surface of the sensor 45 for proximity detection faces a direction inclined at an angle of 10 degrees with respect to the line parallel to the optical axis of the EVF unit 1.

Figure 11:
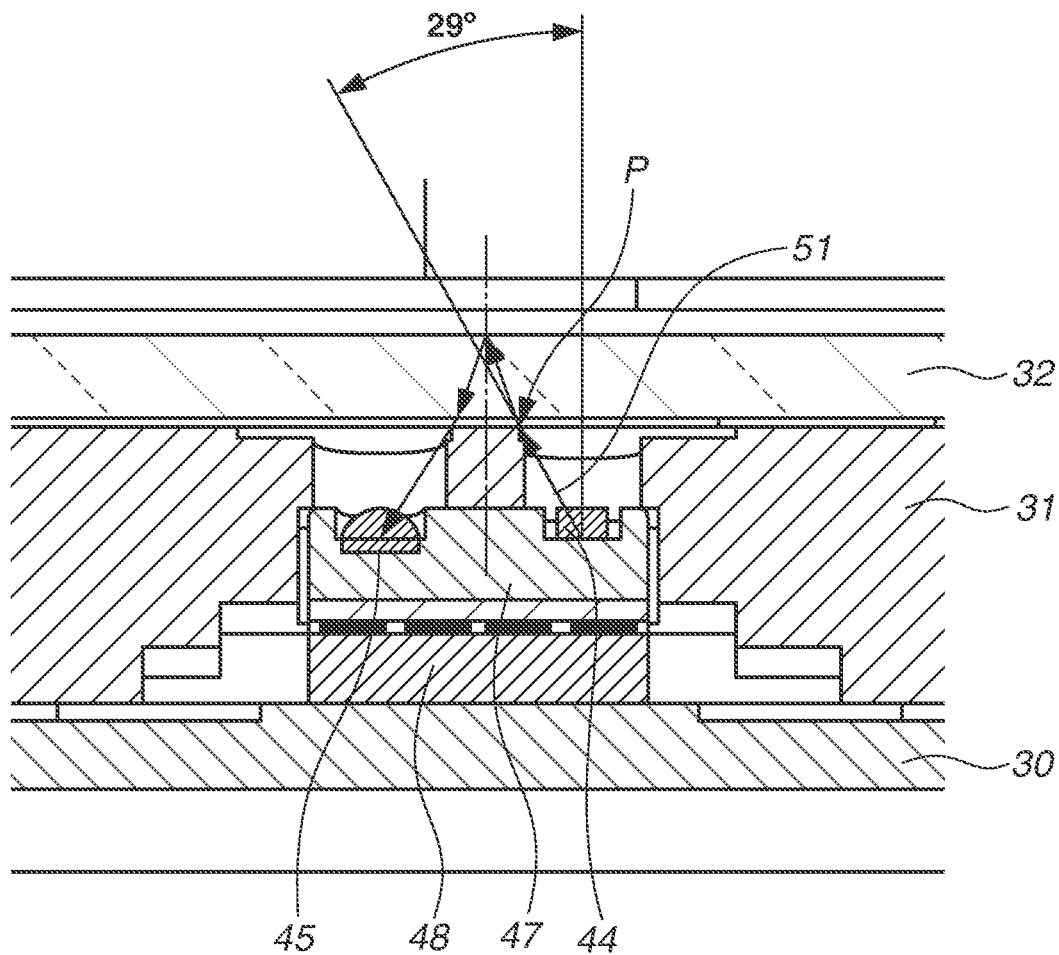
FIG. 11 is a cross-sectional view illustrating the EVF unit 1 at a position including a proximity detection unit 47 according to an aspect of the present invention.
Figure 12:
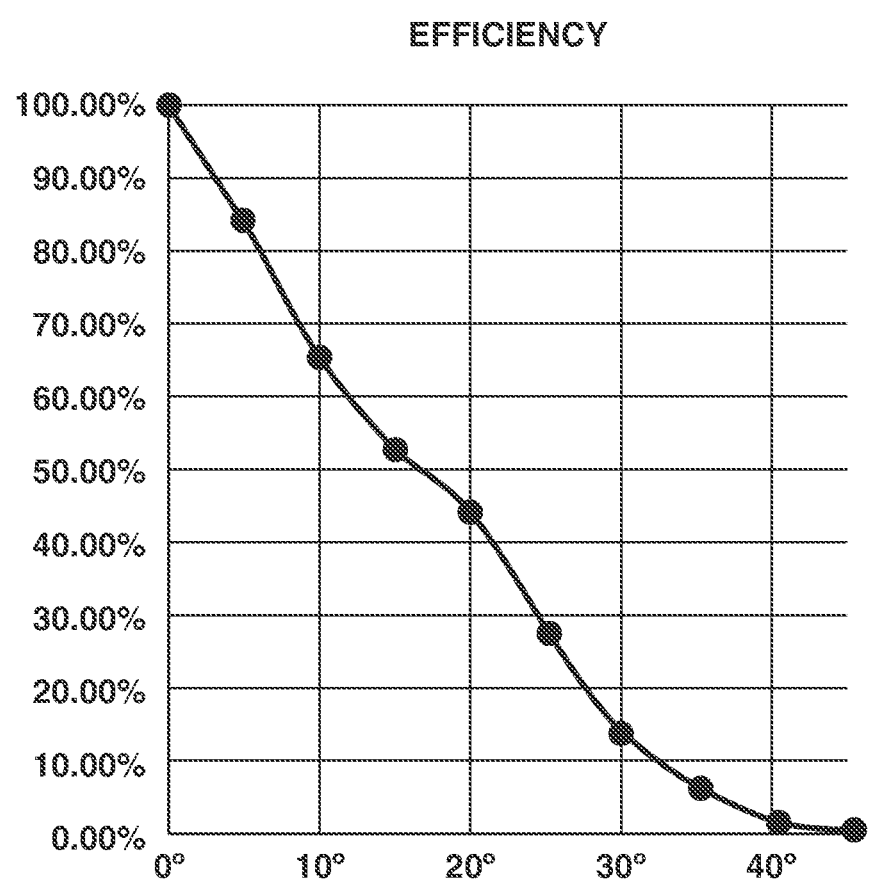
FIG. 12 is a graph illustratively illustrating light transmission/reception characteristics of the proximity detection unit 47.

FIG. 11 is a cross-sectional view of a position including the proximity detection unit 47 and is a cross-sectional view that includes the infrared LED 44 for proximity detection and the sensor 45 for proximity detection and is in the direction parallel to the optical axis of the EVF unit 1. FIG. 12 is a graph illustratively illustrating light transmission/reception characteristics of the proximity detection unit 47. In FIG. 12, a horizontal axis represents angles from a normal direction of the proximity detection unit 47, and a vertical axis represents intensities of light transmission/reception characteristics using the normal direction as a reference.

Crosstalk as a cause of detection errors in the proximity detection unit 47 will be now described with reference to FIGS. 9 to 12. In FIG. 9, a region illustrated as a cross-hatched portion 49 illustrated in FIG. 9 in an inner wall portion of the eyecup attachment frame 8 and the eyecup 9, which is removable, is illuminated with infrared light emitted from the infrared LED 44 for proximity detection. At this time, the ratio between an integral value of infrared light intensities in the cross-hatched portion 49 in a case where the infrared LED 44 for proximity detection is inclined at an angle of 10 degrees (region from 16 degrees to 30 degrees) and an integral value of infrared light intensities in the cross-hatched portion 49 in a case where the infrared LED 44 is not inclined and faces the vertical direction (corresponding to about 6 degrees to 20 degrees because the infrared LED 44 is not inclined at an angle of 10 degrees), i.e., the ratio of 10-degree incline to vertical, is approximately equal to 0.6:1.

As illustrated in FIG. 10, the sensor 45 for proximity detection captures the light in a region illustrated as a cross-hatched portion 50 illustrated in FIG. 10 in the inner wall portion of the eyecup attachment frame 8 and the eyecup 9, which is removable. At this time, the ratio between an integral value of detection sensitivities in the cross-hatched portion 50 in the case where the sensor 45 for proximity detection is inclined at an angle of 10 degrees (region from 16 degrees to 30 degrees) and an integral value of detection sensitivities in the cross-hatched portion 50 in the case where the sensor 45 for proximity detection is not inclined and faces the vertical direction (corresponding to about 6 degrees to 20 degrees because the sensor 45 is not inclined at an angle of 10 degrees), i.e., the ratio of 10-degree incline to vertical, is approximately equal to 0.6:1.

Specifically, the combined ratio of the light transmission side illustrated in FIG. 9 and the light reception side illustrated in FIG. 10, i.e., the ratio of 10-degree incline to vertical, is approximately equal to $0.6^2:1=0.36:1$, and crosstalk originating from an effect of the inner walls of the eyecup attachment frame 8 and the eyecup 9, which is removable, is reduced by approximately 64%. At this time, a signal level for detection with respect to a front direction is not adversely affected because a detection direction is directed in the direction parallel to the optical axis of the EVF unit 1.

Next, crosstalk caused by in-plane reflection in the eyepiece window 32 will be described with reference to FIG. 11. A crosstalk optical path is an optical path via which infrared light emitted from the infrared LED 44 for proximity detection travels through an optical path 51 with one time of reflection by traveling through the R1 surface of the eyepiece window 32, being reflected by the R2 surface, traveling through the R1 surface again, and then reaching the sensor 45 for proximity detection. While there are cases where a plurality of times of reflection is involved, only the case where one time of reflection is involved will be described below, because an intensity decreases significantly correspondingly to the number of times of reflection. Specifically, since the reflectance of the R2 surface is approximately 2%, the intensity is 2% in a case with one time of reflection, 0.04% in a case with two times of reflection, and 0.0008% in a case with three times of reflection.

In a case where the proximity detection unit 47 is opposite the eyepiece window 32, the intensity of infrared light in the direction of 29 degrees illustrated in FIG. 11 is approximately 25% with respect to light emitted from a center of the infrared LED 44 for proximity detection.

Figure 13:
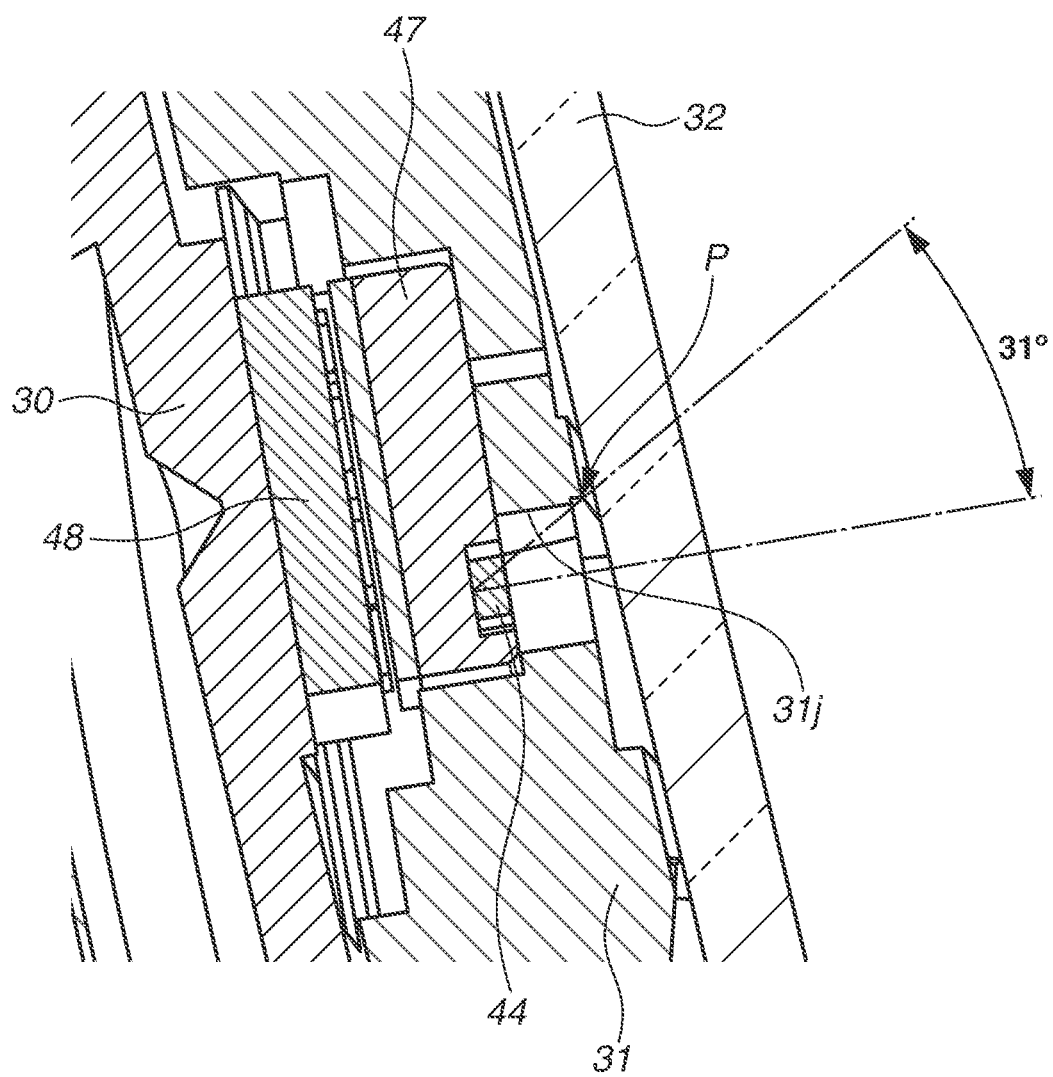
FIG. 13 is a cross-sectional (normal cross-sectional) view illustrating a main portion of the proximity detection unit 47 according to the first exemplary embodiment of the present invention.

A method of calculating an angle with respect to a normal line in a case where the proximity detection unit 47 is inclined at an angle of approximately 10 degrees as illustrated in FIG. 9 will be described below. FIG. 13 is a cross-sectional (normal cross-sectional) view illustrating a main portion of the proximity detection unit 47 according to the first exemplary embodiment of the present invention and illustrates a normal cross section of the proximity detection unit 47 through the center of the infrared LED 44 for proximity detection and a point P As illustrated in FIG. 13, an angle formed by the normal line of the infrared LED 44 for proximity detection and the line passing the point P, which is 29 degrees before reflection, changes to 31 degrees as a result of one time of reflection. The intensity of infrared light in the above-described case is about 22% (the ratio of 10-degree incline to vertical is approximately equal to 0.22:0.25=0.88:1) with respect to the center of the infrared LED 44 for proximity detection based on the graph of light transmission/reception characteristics illustrated in FIG. 12.

The ratio of 10-degree incline to vertical is approximately equal to $0.88^2:1=0.77:1$ in the proximity detection unit 47 in total, and crosstalk originating from an effect of in-plane reflection in the eyepiece window 32 is reduced by approximately 23%.

As described above, the proximity detection unit 47 is inclined at a predetermined angle with respect to the eyepiece window 32, and this effectively reduces crosstalk through a wall surface of the eyecup attachment frame 8 and crosstalk through in-plane reflection by the eyepiece window 32.

Next, a structure of the optical path split prism unit 16 and the line-of-sight detection unit 4 in the EVF unit 1 will be described. The line-of-sight detection unit 4 according to the present exemplary embodiment includes at least a line-of-sight imaging lens 52, the line-of-sight detection sensor 53, and a diaphragm 56 for line-of-sight detection and may include the infrared LEDs 36 to 43 for line of sight and the optical path split prism unit 16.

Figure 14:
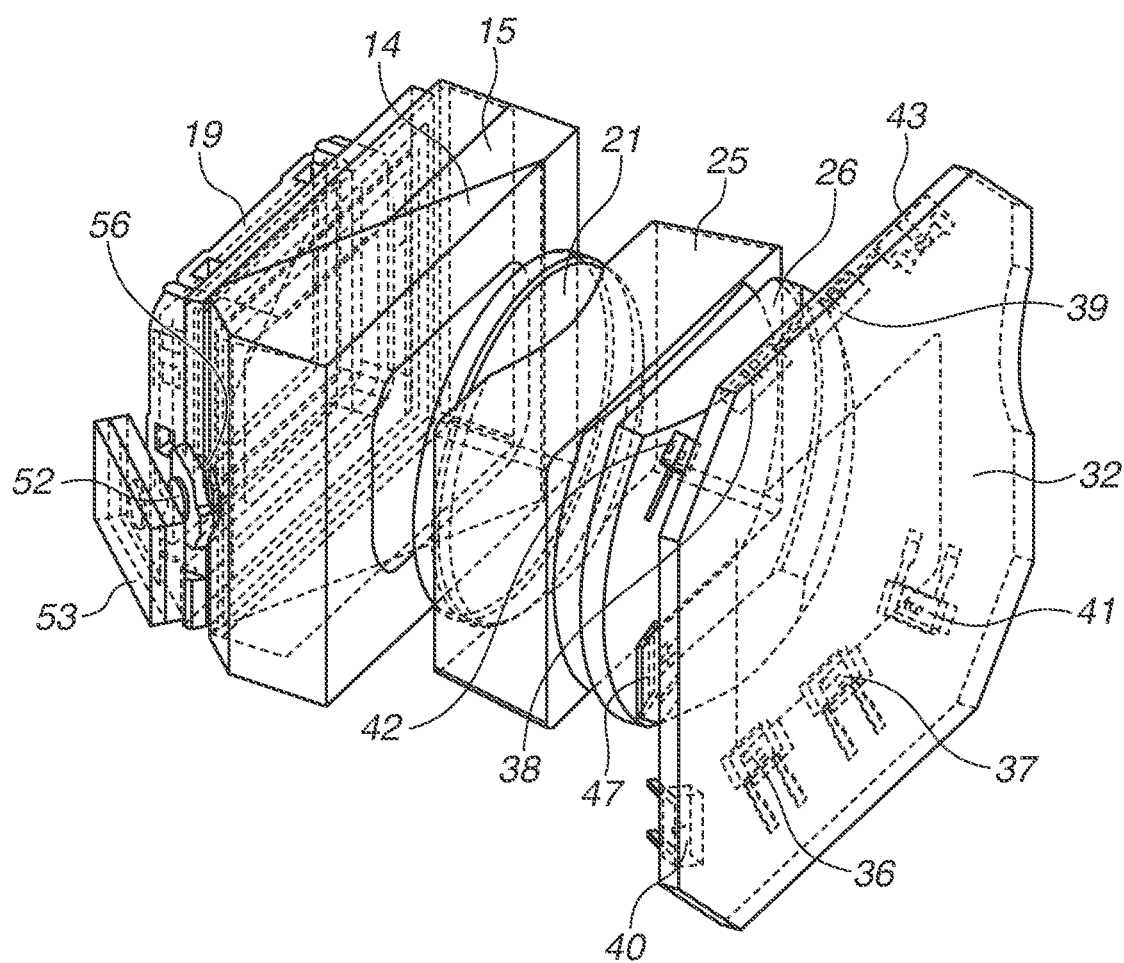
FIG. 14 is a perspective view illustratively illustrating mainly a portion relating to a line-of-sight detection function in the EVF unit 1 according to the first exemplary embodiment of the present invention.
Figure 15:
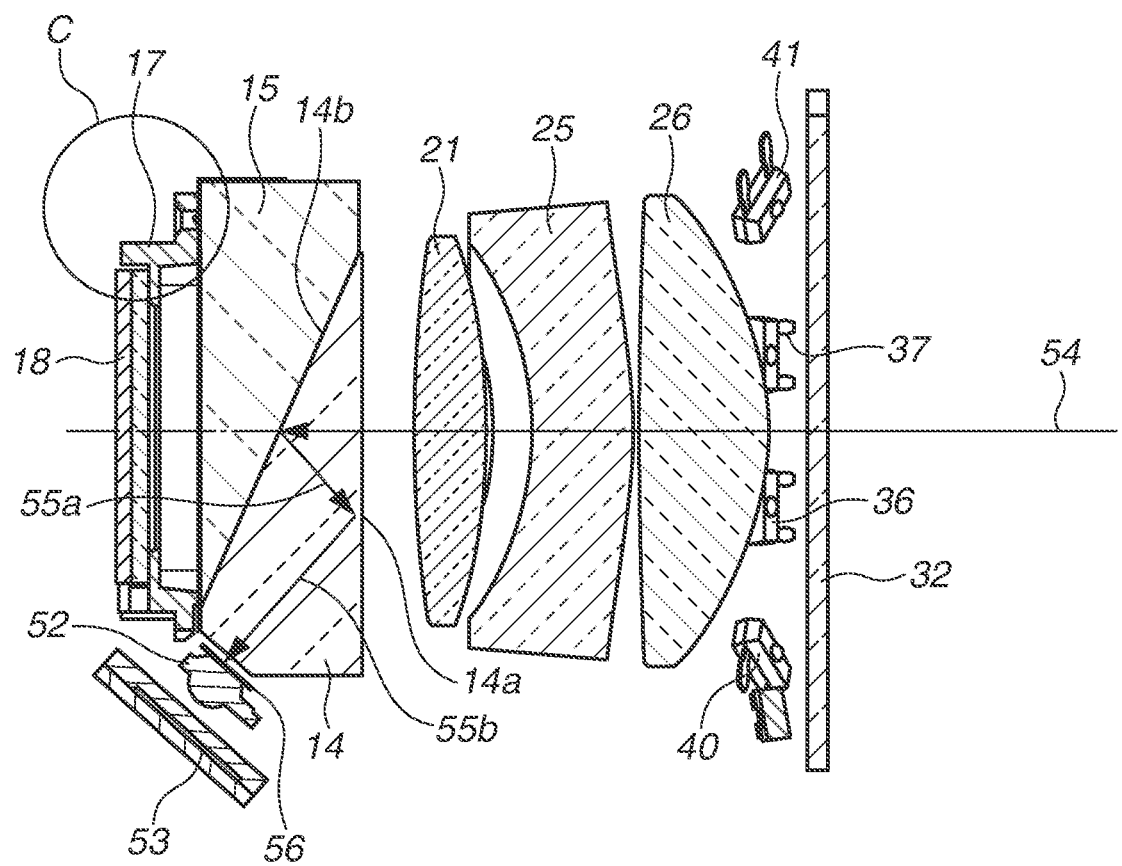
FIG. 15 is a cross-sectional view illustrating mainly the portion relating to the line-of-sight detection function in the EVF unit 1 according to the first exemplary embodiment of the present invention.
Figure 16:
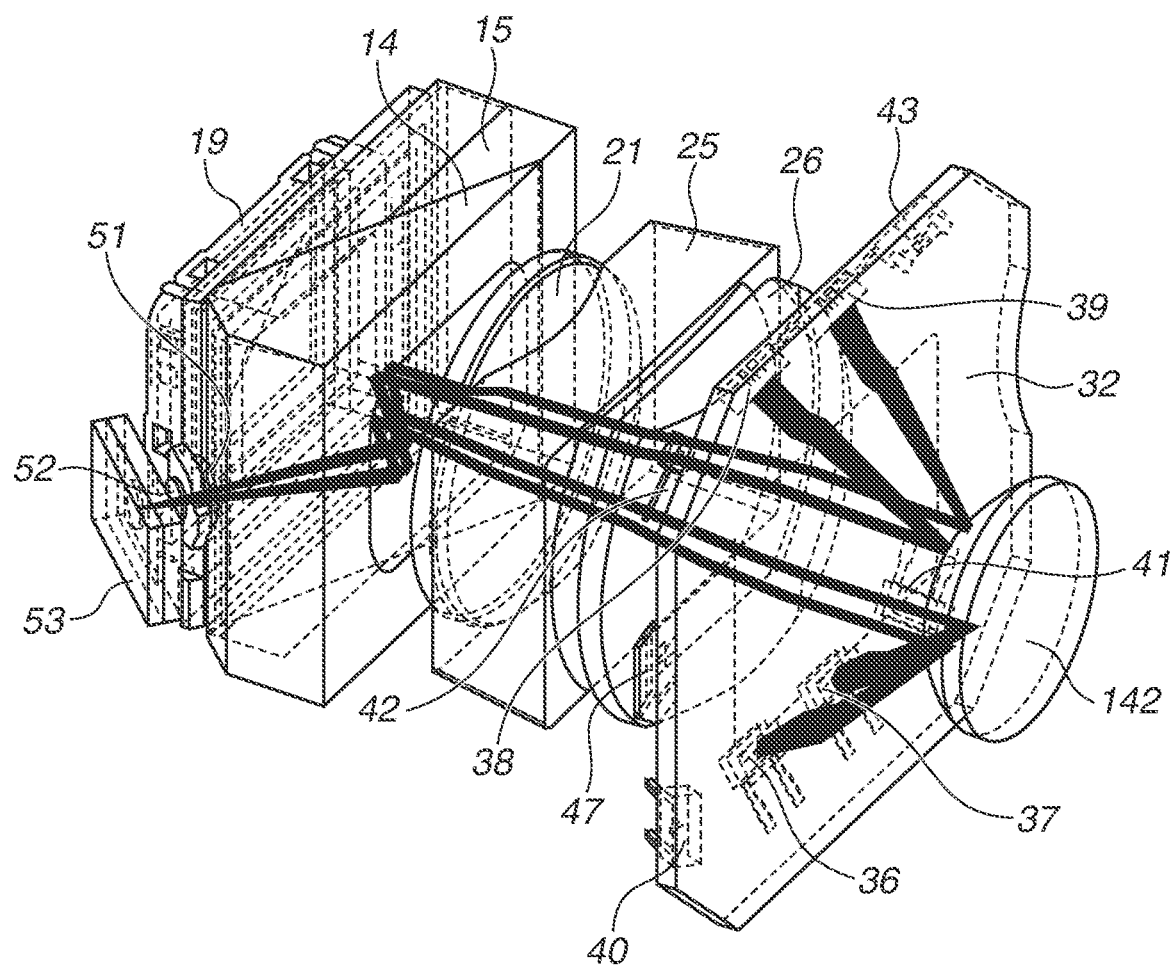
FIG. 16 is a diagram illustratively illustrating an optical path for line-of-sight detection in the EVF unit 1 according to an aspect of the present invention.

FIG. 14 is a perspective view illustratively illustrating mainly a portion relating to the line-of-sight detection function in the EVF unit 1 according to the first exemplary embodiment of the present invention. FIG. 15 is a cross-sectional view illustrating mainly the portion relating to the line-of-sight detection function in the EVF unit 1 according to the first exemplary embodiment of the present invention and is a transverse cross-sectional view with respect to the direction parallel to the optical axis of the EVF unit 1. FIG. 16 is a diagram illustratively illustrating an optical path for line-of-sight detection in the EVF unit 1 according to an aspect of the present invention with respect to the perspective view illustrated in FIG. 14.

The infrared LEDs 36 to 43 for line of sight are provided at different positions in different orientations to emit infrared light in different directions to the eyeball of the user. For example, the infrared LEDs 36 to 43 for line of sight are disposed in different orientations with respect to a glass surface of the plate glass 32c of the eyepiece window 32.

The infrared LEDs 36, 37, 38, and 39 for line of sight are illumination devices that emit infrared wavelength light mainly for short-range illumination and use a LED as a light source. The infrared LEDs 40, 41, 42, and 43 for line of sight are illumination devices that emit infrared wavelength light mainly for long-range illumination and use a LED as a light source.

The line-of-sight imaging lens 52 is an optical system for line-of-sight detection and forms an image of light emitted from the infrared LEDs 36 to 39, and 40 to 43 for line of sight and reflected by the eye of the user on the line-of-sight detection sensor 53. The line-of-sight detection sensor 53 is a sensor for line-of-sight detection using a solid-state image sensor, such as a CCD image sensor, and is a detection unit capable of detecting a line of sight of the eye of the user near the eyepiece portion 107. Since the line-of-sight detection sensor 53 images infrared wavelength reflection light for line-of-sight detection, the line-of-sight detection sensor 53 can be configured to acquire either one of color images or monochrome images. An opening size of the diaphragm 56 for line-of-sight detection is adjusted to adjust the amount of light entering the line-of-sight detection sensor 53 and to adjust a depth of field such that images of the eyeball of the user are not blurred.

As illustrated in FIG. 15, infrared light emitted from a predetermined infrared LED for line of sight travels as an eyeball image reflected by the eyeball of the user through the eyepiece window 32, the finder lens 26, the G2 lens 25, and the G1 lens 21, and enters a second surface 14a of the first optical path split prism 14. An incidence optical path of the incident light is illustrated as an optical path 54 in FIG. 15.

On a first surface 14b of the first optical path split prism 14, a dichroic layer that reflects infrared light is formed. Thus, the eyeball image of the user after entering the EVF unit 1 is reflected by the first surface 14b and travels toward the second surface 14a. An optical path of the reflection light is illustrated as a reflection optical path 55a in FIG. 15.

The reflection light traveling through the reflection optical path 55a is totally reflected by the second surface 14a, travels through an imaging optical path 55b, and forms an image on the line-of-sight detection sensor 53 through the line-of-sight imaging lens 52 via a diaphragm 56.

As illustrated in FIG. 16, the camera body 101 according to the present exemplary embodiment uses a cornea reflection image together with a pupil image of the eyeball for line-of-sight detection. The cornea reflection image is formed by specular reflection of illumination from the infrared LEDs 36 to 39, and 40 to 43 for line of sight by a cornea 142 of the eyeball of the user.

Figure 17:
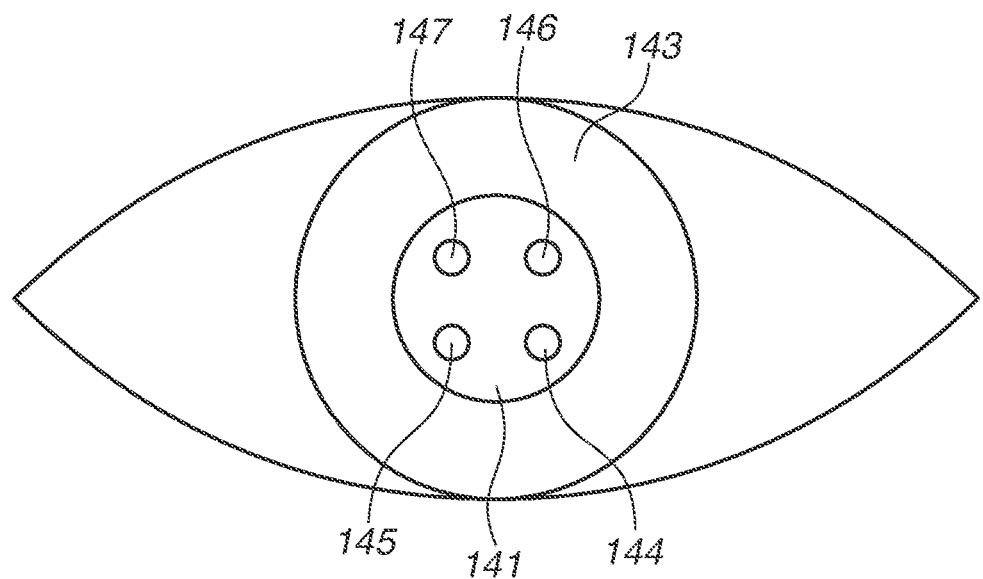
FIG. 17 is a diagram illustratively illustrating an arrangement of an eyeball of a user and reflection images.

FIG. 17 is a diagram illustratively illustrating an arrangement of the eyeball of the user and reflection images. FIG. 17 illustrates a case where an eyeball image and cornea reflection images have a short eyeball distance. In FIG. 17, the eyeball of the user includes a pupil 141 and an iris 143, and cornea reflection images 144 to 147 are cornea reflection images formed by light emitted from the infrared LEDs 36 to 39, and 40 to 43 for line of sight.

A reflection image corresponding to the infrared LED 36 for line of sight is the cornea reflection image 144. A reflection image corresponding to the infrared LED 37 for line of sight is the cornea reflection image 145. A reflection image corresponding to the infrared LED 38 for line of sight is the cornea reflection image 146. A reflection image corresponding to the infrared LED 39 for line of sight is the cornea reflection image 147.

The line-of-sight detection (detection of line-of-sight direction) according to the present exemplary embodiment detects a line of sight based on a relative relationship between a pupil center and cornea reflection images. The line-of-sight detection can use, for example, a method discussed in Japanese Patent No. 3186072, and detailed descriptions of the line-of-sight detection method are omitted.

<Description of Line-of-Sight Detection Operation>

Figure 19A:
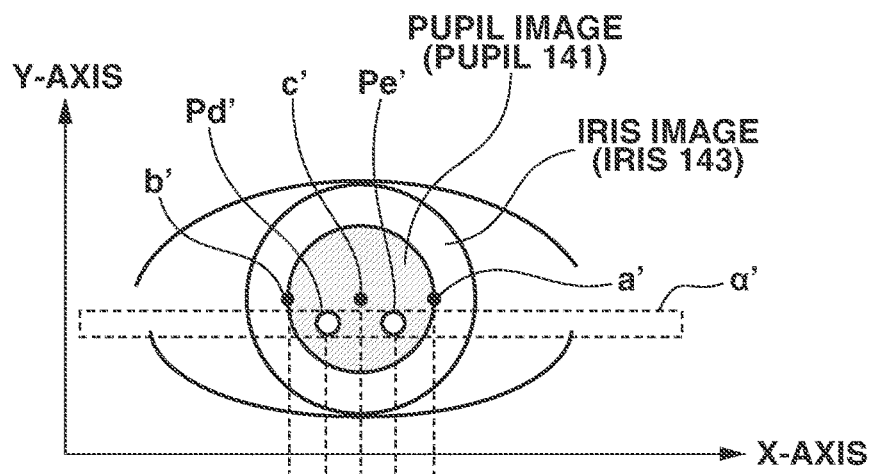
FIG. 19A is a diagram illustratively illustrating an eye image on a line-of-sight detection sensor.
Figure 19B:
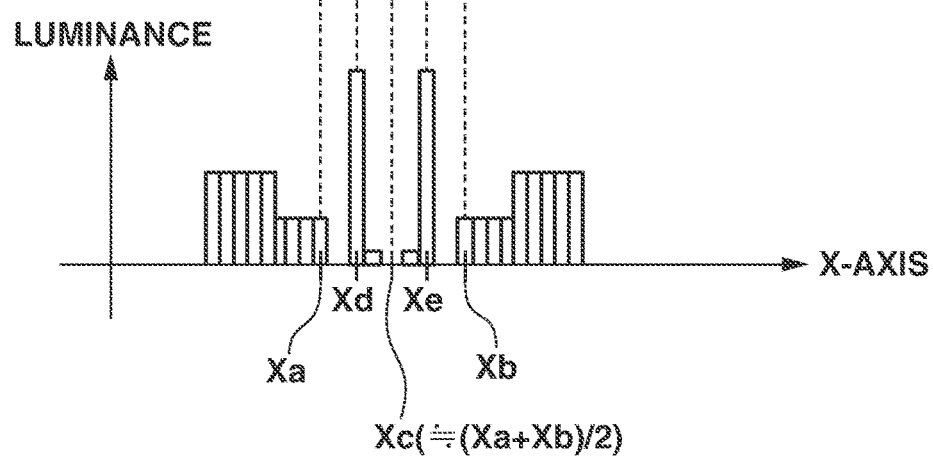
FIG. 19B is a diagram illustratively illustrating an eye image on a line-of-sight detection sensor.
Figure 20:
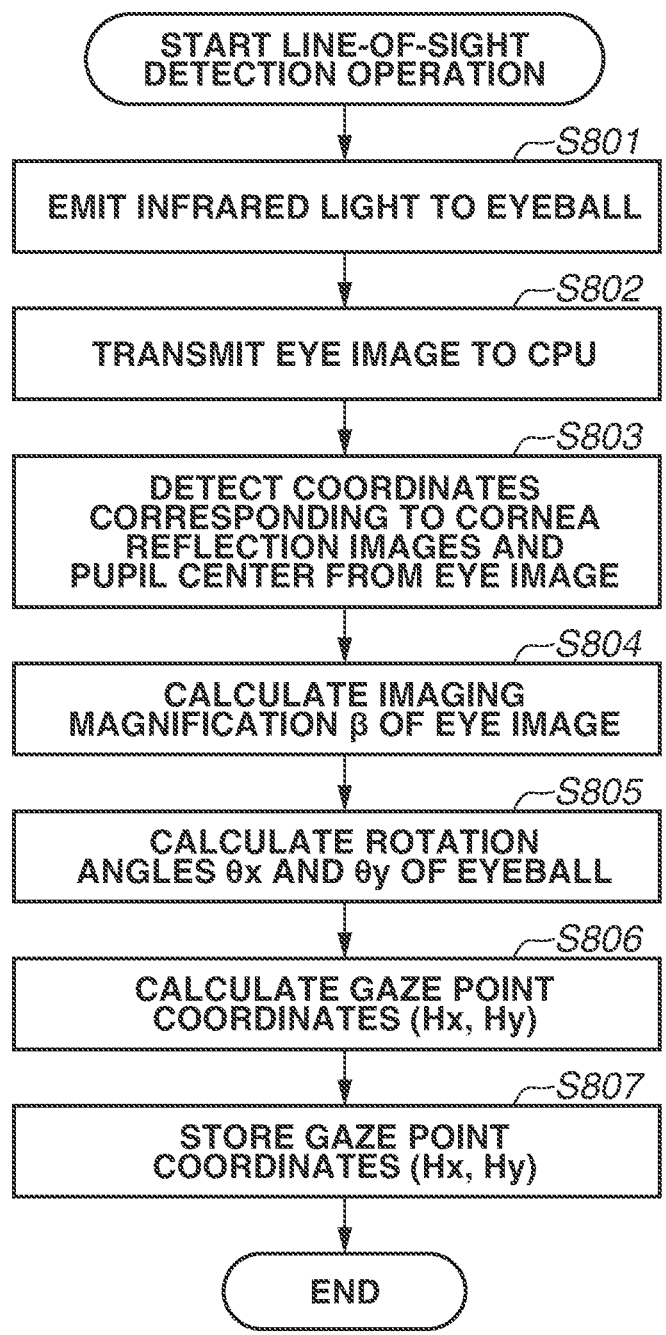
FIG. 20 is a schematic flowchart illustrating a line-of-sight detection operation according to the first exemplary embodiment of the present invention.

A line-of-sight detection method will be described with reference to FIGS. 18, 19A, 19B, and 20. FIG. 18 is a diagram illustratively illustrating a principle of the line-of-sight detection method and is a schematic diagram illustrating an optical system for performing line-of-sight detection. As illustrated in FIG. 18, light sources 131a and 131b as a virtual light source 131 are disposed substantially symmetrically with respect to an optical axis of a light receiving lens 130 and illuminate an eyeball 140 of the user. Part of the light emitted from the light sources 131a and 131b and reflected by the eyeball 140 is focused on the line-of-sight detection sensor 53 by the light receiving lens 130. FIGS. 19A and 19B are diagrams illustratively illustrating an eye image on the line-of-sight detection sensor 53. FIG. 19A is a schematic diagram illustrating an eye image (an eyeball image projected to the line-of-sight detection sensor 53) imaged by the line-of-sight detection sensor 53, and FIG. 19B is a diagram illustrating CCD output intensities of the line-of-sight detection sensor 53. FIG. 20 is a schematic flowchart illustrating a line-of-sight detection operation according to the first exemplary embodiment of the present invention.

If the line-of-sight detection operation is started, in step S801 in FIG. 20, the light sources 131a and 131b emit infrared light toward the eyeball 140 of the user. An eyeball image of the user illuminated with the infrared light travels through the light receiving lens 130 and is formed on the line-of-sight detection sensor 53, and the line-of-sight detection sensor 53 photoelectrically converts the formed image. A processible electric signal of the eye image is thereby acquired.

In step S802, the line-of-sight detection unit 4 transmits the eye image (eye image signal; electric signal of the eye image) acquired from the line-of-sight detection sensor 53 to the CPU 111.

In step S803, the CPU 111 calculates, from the eye image acquired in step S802, coordinates of points corresponding to cornea reflection images Pd and Pe of the light sources 131a and 131b and a pupil center c.

The infrared light emitted from the light sources 131a and 131b illuminates the cornea 142 of the eyeball 140 of the user. At this time, the cornea reflection images Pd and Pe formed by part of the infrared light reflected by a surface of the cornea 142 are focused by the light receiving lens 130, and form images on the line-of-sight detection sensor 53 to obtain cornea reflection images Pd' and Pe' on the eye image. Similarly, light beams from end portions a and b of the pupil 141 form images on the line-of-sight detection sensor 53 to obtain pupil end images a' and b' on the eye image.

FIG. 19B illustrates luminance information (luminance distribution) about a region α' of an eye image in FIG. 19A. FIG. 19B illustrates a luminance distribution in an X-axis direction, where the X-axis direction is a horizontal direction of the eye image and a Y-axis direction is a vertical direction of the eye image. According to the present exemplary embodiment, coordinates Xd and Xe are coordinates of the cornea reflection images Pd' and Pe' in the X-axis direction (horizontal direction), and coordinates Xa and Xb are coordinates of the pupil end images a' and b' in the X-axis direction. As illustrated in FIG. 19B, extremely high level luminances are obtained at the coordinates Xd and Xe of the cornea reflection images Pd' and Pe'. Extremely low level luminances are obtained in a region from the coordinate Xa to the coordinate Xb, except at the coordinates Xd and Xe. The region from the coordinate Xa to the coordinate Xb corresponds to the region of the pupil 141 (a region of pupil images formed on the line-of-sight detection sensor 53 by light beams from the pupil 141). Intermediate luminances between the above-described two types of luminances are obtained in a region (a region of iris images outside the pupil images that are formed by light beams from the iris 143) of the iris 143 outside the pupil 141. Specifically, intermediate luminances between the above-described two types of luminances are obtained in a region of X-coordinates (coordinates in the X-axis direction) smaller than the coordinate Xa and a region of X-coordinates greater than the coordinate Xb.

The X-coordinates Xd and Xe of the cornea reflection images Pd' and Pe' and the X-coordinates Xa and Xb of the pupil end images a' and b' are obtained from the luminance distribution illustrated in FIG. 19B. Specifically, coordinates with extremely high luminances are obtained as coordinates of the cornea reflection images Pd' and Pe', and coordinates with extremely low luminances are obtained as coordinates of the pupil end images a' and b'. Further, in a case where a rotation angle θx of an optical axis of the eyeball 140 with respect to an optical axis of the virtual light receiving lens 130 is small, a coordinate Xc of a pupil center image c' (pupil image center) formed on the line-of-sight detection sensor 53 by light beams from the pupil center c is expressed as Xc≈(Xa+Xb)/2. Specifically, the coordinate Xc of the pupil center image c' is calculated from the X-coordinates Xa and Xb of the pupil end images a' and b'. The coordinates of the cornea reflection images Pd' and Pe' and the pupil center image c' are estimated as described above.

In step S804, the CPU 111 calculates an imaging magnification 13 of the eyeball image. The imaging magnification 13 is a magnification that is determined based on the position of the eyeball 140 with respect to the light receiving lens 130 and is obtained using a function of an interval (Xd−Xe) between the cornea reflection images Pd' and Pe'.

In step S805, the CPU 111 calculates rotation angles of the optical axis of the eyeball 140 with respect to the optical axis of the light receiving lens 130. An X-coordinate of a midpoint between the cornea reflection images Pd and Pe substantially matches an X-coordinate of a center of curvature O of the cornea 142. Thus, a rotation angle $θ°_X$ of the eyeball 140 in a Z-X plane (a plane perpendicular to the Y-axis) is calculated using formula (1) below, where Oc is a standard distance from the center of curvature O of the cornea 142 to the center c of the pupil 141. A rotation angle θy of the eyeball 140 in a Z-Y plane (a plane perpendicular to the X-axis) is calculated using a method similar to the method for calculating the rotation angle θx.

$$β \times Oc \times \sin θ_X ≈ \{(Xd+Xe)/2\} - Xc \quad (1).$$

In step S806, the CPU 111 calculates (estimates) a gaze point (a position to which a line of sight is directed; a position at which the user is looking) of the user on an image for viewing that is displayed on the EVF unit 1 using the rotation angles θx and θy calculated in step S805. In a case where coordinates (Hx, Hy) of the gaze point are coordinates corresponding to the pupil center c, the coordinates (Hx, Hy) of the gaze point are calculated using formulas (2) and (3) below.

$$Hx = m \times (Ax \times θx + Bx) \quad (2).$$

$$Hy = m \times (Ay \times θy + By) \quad (3).$$

The parameter m in formulas 2 and 3 is a constant number determined based on a structure of a finder optical system (e.g., light receiving lens 130) of the camera body 101. The parameter m is also a conversion coefficient for converting the rotation angles θx and θy into coordinates corresponding to the pupil center c on the image for viewing. These are predetermined and stored in the memory unit 112. The parameters Ax, Bx, Ay, and By are line-of-sight correction parameters for correcting individual differences in line of sight. The parameters Ax, Bx, Ay, and By are acquired by performing a calibration operation described below and stored in the memory unit 112 before the line-of-sight detection operation is initiated.

In step S807, the CPU 111 stores the coordinates (Hx, Hy) of the gaze point into the memory unit 112, and the line-of-sight detection operation ends.

Figure 21A:
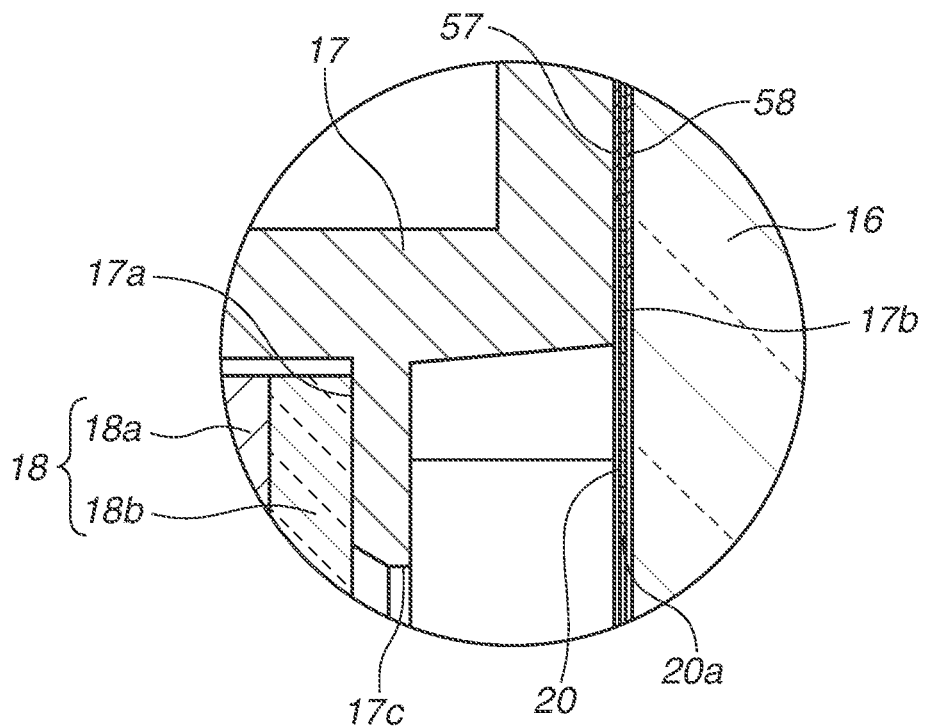
FIG. 21A is a diagram illustratively illustrating a structure of an optical path split prism unit 16 according to the first exemplary embodiment of the present invention.
Figure 21B:
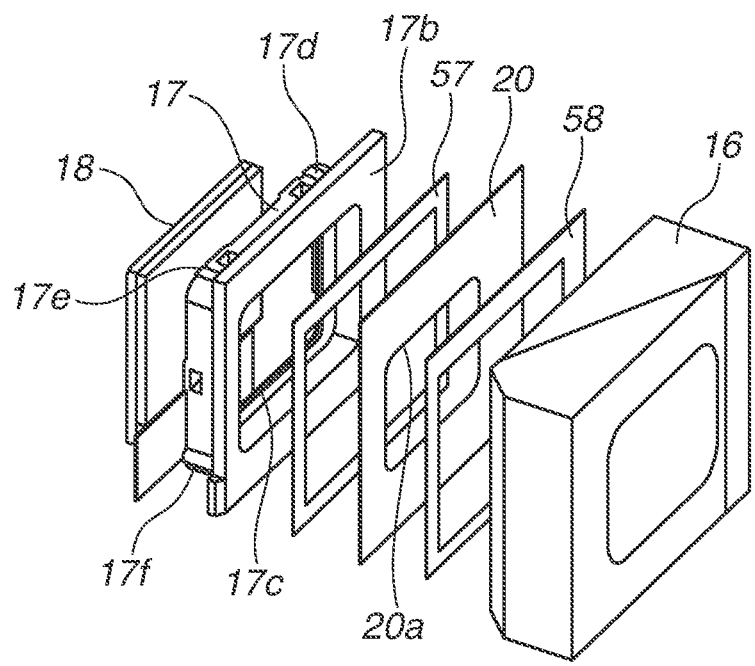
FIG. 21B is a diagram illustratively illustrating a structure of an optical path split prism unit 16 according to the first exemplary embodiment of the present invention.

Next, a detailed structure of the optical path split prism unit 16 will be described with reference to FIGS. 21A and 21B. FIGS. 21A and 21B are diagrams illustratively illustrating a structure of the optical path split prism unit 16 according to the first exemplary embodiment of the present invention. FIG. 21A is a cross-sectional view illustrating details of a portion C specified in FIG. 15. The display panel 18 includes a semiconductor chip 18a and a glass plate 18b. The semiconductor chip 18a includes an organic electroluminescent (organic EL) element and a circuit for operating the organic EL element (display surface). The display panel 18 is abutted against a display panel abutment surface 17a of the panel holder 17 and fixed by bonding with, for example, an adhesive. The panel holder 17 is made of resin. The panel holder 17 includes a prism attachment surface 17b on the opposite side to the display panel abutment surface 17a. A first double-sided tape 57, a panel mask 20, and a second double-sided tape 58 are arranged in this order between the prism attachment surface 17b and the optical path split prism unit 16 and are each fixed by bonding with a double-sided tape. The bonding can use a method using, for example, an adhesive.

As described above, a feature of the present exemplary embodiment is that the optical path split prism unit 16 is substantially sealed and attached without using a protection member for preventing entrance of dust into the display panel 18 (display panel unit 19). A conventional EVF includes a protection glass for preventing entrance of dust on a front surface of the display panel unit 19 so that no dust is visible in viewing a screen of a display panel. However, dust may adhere to the outside of the protection glass, and in a case where the protection glass is excessively close to a display surface of the display panel, the dust adhering on the outside of the protection glass may be imaged and included in formed images, so that the protection glass is disposed with a predetermined distance or longer along an optical axis of the display panel. On the contrary, according to the present exemplary embodiment, the thickness of the optical path split prism unit 16 in the optical axis direction provides a distance for preventing dust on the outside of the optical path split prism unit 16 from forming an image on the display surface of the display panel 18. Thus, while accommodating the line-of-sight detection function, the space of the entire finder is made more compact than a case where a conventional display panel unit and an optical system for line-of-sight detection are simply arranged.

A second opening portion 20a of the panel mask 20 passes light from the display panel 18 and light beams from the eyehole (reflection light from the pupils of the user) while a portion other than the second opening portion 20a of the panel mask 20 cuts stray light entering through end portions of the optical path split prism unit 16. The panel mask 20 contains a material with high heat resistance to be resistant to heat in a case where light beams from the eyehole are imaged nearby. According to the present exemplary embodiment, the panel mask 20 contains a metal plated with black. The panel holder 17 includes an opening portion 7c so that the opening portion 7c passes light from the display panel 18 and light beams (including reflection light from the pupil of the user) from the eyehole while a portion other than a first opening portion 17c provides a mask to make the circuit portion of the semiconductor chip 18a invisible from the eyehole side. While the first opening portion 17c is opened to be outside the second opening portion 20a when viewed from the EVF lens unit 29 side according to the present exemplary embodiment, the present invention is not limited to that described above.

FIG. 21B is an exploded perspective view illustrating the display panel unit 19 and the optical path split prism unit 16, and each portion corresponding to FIG. 21A is given the same reference number as in FIG. 21A.

According to the present exemplary embodiment, the display panel unit 19 is attached to the optical path split prism unit 16 by positioning the panel mask 20 and the optical path split prism unit 16 with respect to the display panel 18 using jigs. For the positioning, the panel holder 17 includes Y-direction references 17d and 17e to determine a level and a Y-dimension and includes an X-direction reference 17f to determine an X-dimension. The panel mask 20 and the optical path split prism unit 16 are attached using the references 17d, 17e, and 17f.

As described above, according to the present exemplary embodiment, the optical path split prism unit 16 is substantially sealed and attached without a protection member for preventing entrance of dust into the display panel unit 19 in the EVF unit 1 having the line-of-sight detection function. Specifically, the display panel unit 19 and the optical path split prism unit 16 of the EVF unit 1 according to the present exemplary embodiment are attached together and integrally formed. This makes it unnecessary to provide a separate protection glass for preventing entrance of dust into the display panel unit 19. Thus, an optical path length from the eyehole of the finder to the display surface of the display panel is reduced, and while the structure (space) of the entire EVF is made compact, a wide viewing angle with respect to the display panel 18 is obtained. Further, use of the above-described structure facilitates positioning of three optical axes that are optical axes of the display surface of the display panel unit 19, the optical path split prism unit 16, and the EVF lens unit 29 in assembling the EVF unit 1.

Further, the optical path split prism unit 16 according to the present exemplary embodiment has a greater interval (space, optical path length) between the display panel 18 and the optical path split prism unit 16 than a predetermined value. With this structure, foreign matter on the optical path split prism unit 16 is prevented from being viewed by the user.

Second Exemplary Embodiment

An EVF unit having the line-of-sight detection function according to a second exemplary embodiment of the present invention will be described below with reference to FIG. 22. The EVF unit according to the present exemplary embodiment is applicable to the camera body 101, which is a similar electronic device to that described in the first exemplary embodiment, and a difference from the EVF unit 1 according to the first exemplary embodiment is a structure of an optical path split prism unit.

Thus, redundant descriptions of components similar to those of the EVF unit 1 according to the first exemplary embodiment are omitted, and the optical path split prism unit according to the present exemplary embodiment will be described in detail.

Figure 22:
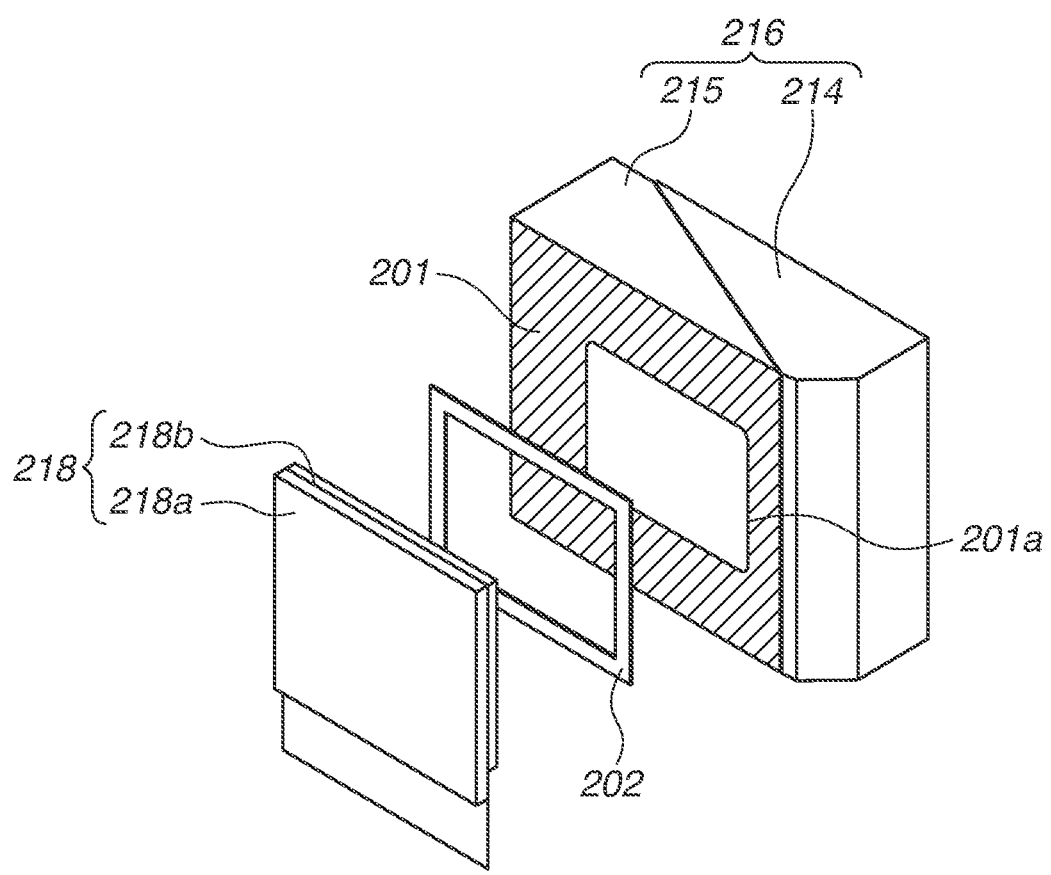
FIG. 22 is an exploded perspective view illustrating an optical path split prism unit 216 and a display panel 218 according to a second exemplary embodiment of the present invention.

FIG. 22 is an exploded perspective view illustrating an optical path split prism unit 216 and a display panel 218 according to the second exemplary embodiment of the present invention. As illustrated in FIG. 22, the optical path split prism unit 216 according to the present exemplary embodiment includes a first optical path split prism 214, a second optical path split prism 215, and a black mask 201, and a dichroic layer is formed on an attachment surface of the two prisms as in the first exemplary embodiment.

The black mask 201 is formed by sputtering on an incidence surface of the second optical path split prism 215 on the display unit side. The black mask 201 is a shaded portion illustrated in FIG. 22. The black mask 201 includes an opening portion 201a.

The display panel 218 includes a semiconductor chip 218a and a glass plate 218b as in the first exemplary embodiment. The semiconductor chip 218a includes an organic EL element (display surface) and a circuit for operating the organic EL element.

As described above, according to the present exemplary embodiment, the display panel 218 is attached directly to the second optical path split prism 15 with a double-sided tape 202. Specifically, a feature is that the black mask 201 is provided to prevent unnecessary matter from being visible on a field when the user looks into the eyepiece portion 107 of the camera body 101.

With the above-described structure, the display panel 218 is attached directly to the second optical path split prism 215, and a separate protection glass for preventing entrance of dust into the display panel 218 is unnecessary, so that the optical path length from the eyehole of the finder to the display surface of the display panel is reduced.

Third Exemplary Embodiment

Figure 23:
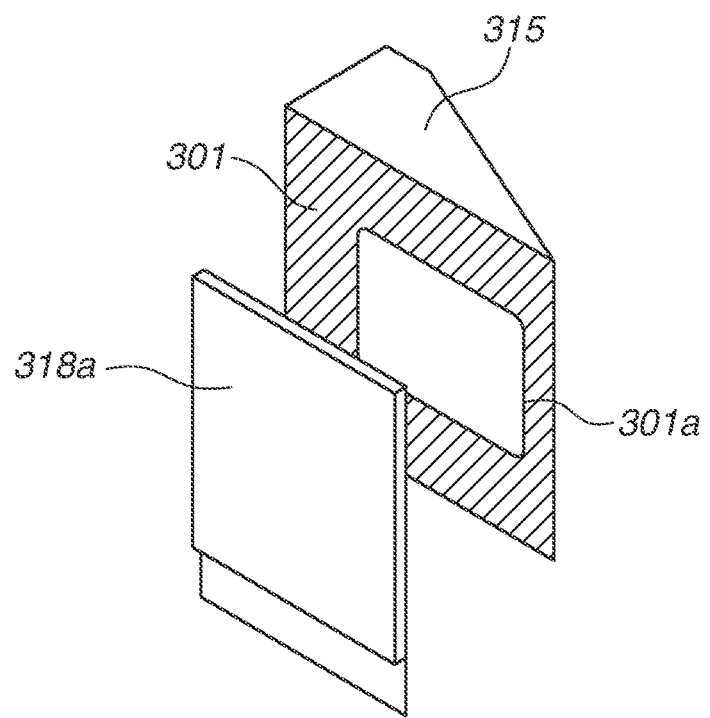
FIG. 23 is an exploded perspective view illustrating an optical path split prism 315 and a semiconductor chip 318a for display according to a third exemplary embodiment of the present invention.

An EVF unit having the line-of-sight detection function according to a third exemplary embodiment of the present invention will be described below with reference to FIG. 23.

The EVF unit according to the present exemplary embodiment is applicable to the camera body 101, which is a similar electronic device to that described in the first exemplary embodiment, and a difference from the EVF unit 1 according to the first exemplary embodiment is a structure of an optical path split prism unit.

Thus, redundant descriptions of components similar to those of the EVF unit 1 according to the first exemplary embodiment are omitted, and the optical path split prism unit according to the present exemplary embodiment will be described in detail. FIG. 23 is an exploded perspective view illustrating an optical path split prism 315 and a semiconductor chip 318a for display according to the third exemplary embodiment of the present invention. As illustrated in FIG. 23, the optical path split prism 315 according to the present exemplary embodiment is a prism similar to the second optical path split prism 15 according to the first exemplary embodiment and is attached directly to the semiconductor chip 318a including an organic EL.

A black mask 301 is formed by sputtering on the optical path split prism 315 as in the second exemplary embodiment. The black mask 301 is a shaded portion illustrated in FIG. 23. The black mask 301 includes an opening portion 301a.

The semiconductor chip 318a is attached directly to the optical path split prism 315 with an adhesive for tight sealing.

As described above, according to the present exemplary embodiment, the optical path split prism 315 is attached directly to the semiconductor chip 318a including an organic EL element (display surface) and a circuit for operating the organic EL element.

With the above-described structure, it is unnecessary to provide a separate glass for element protection or a separate protection glass for preventing entrance of dust to the semiconductor chip 318a, and the optical path length from the eyepiece portion 107 to the display surface of the display panel (semiconductor chip 318a) is more reduced than the above-described exemplary embodiments.

Fourth Exemplary Embodiment

Figure 24:
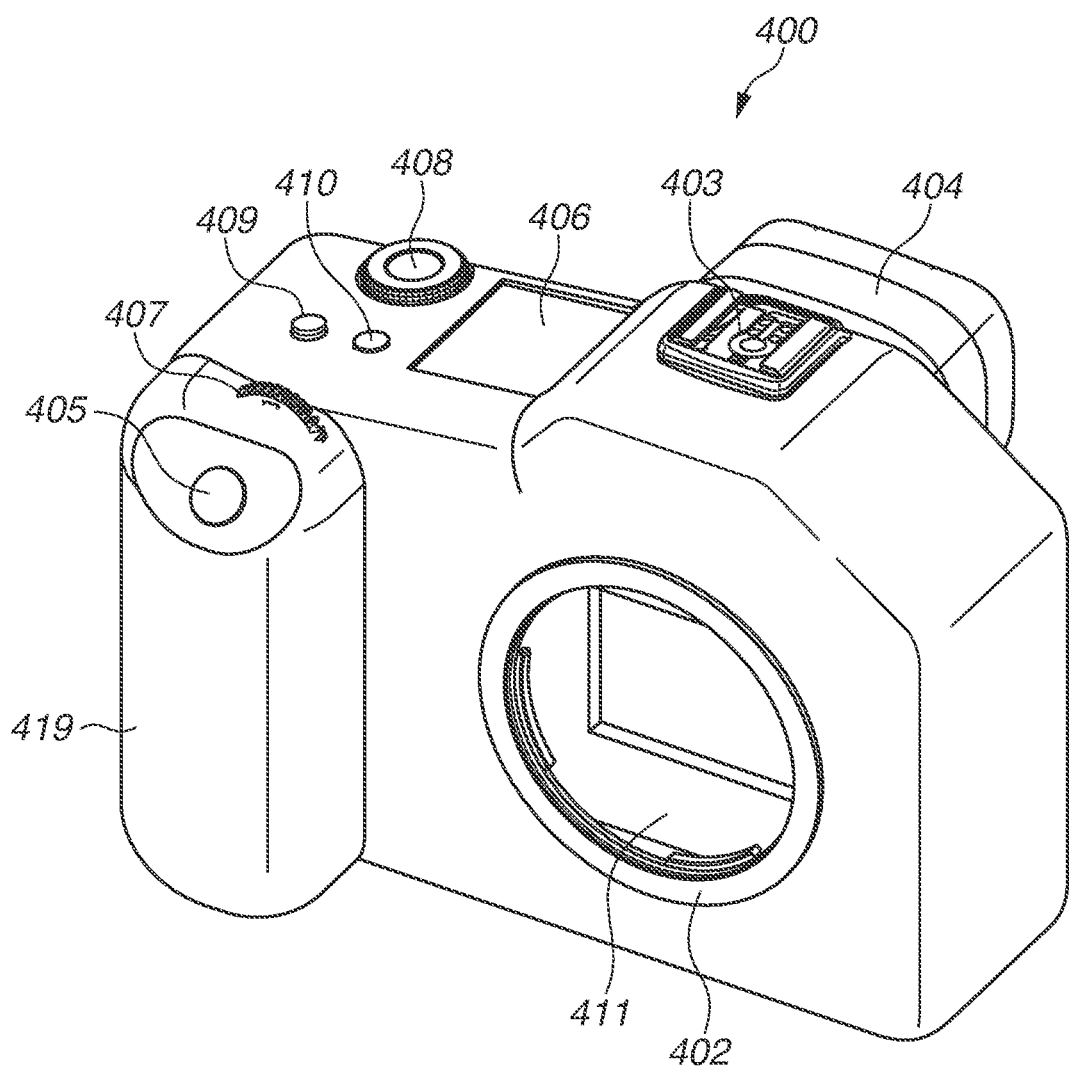
FIG. 24 is an external perspective view illustrating a camera body 400 as an electronic device according to a fourth exemplary embodiment of the present invention.

A structure of a camera body that is an electronic device including an EVF unit according to a fourth exemplary embodiment of the present invention will be described below with reference to FIGS. 24 to 26. FIG. 24 is an external perspective view illustrating a camera body 400 as an electronic device according to the fourth exemplary embodiment of the present invention. An EVF unit 401 of the camera body 400 according to the present exemplary embodiment is substantially the same as the EVF unit 1 according to the first exemplary embodiment, so that an arrangement of components of the electronic device and an arrangement and a structure of the EVF unit 401 according to the present exemplary embodiment will be described. Further, the camera body 400 according to the present exemplary embodiment and the camera body 101 according to the first exemplary embodiment have basically the same arrangement of the components. For example, a positional relationship between the EVF unit 401 and a diopter adjustment portion 416 and a release button 405 according to the present exemplary embodiment is substantially the same as that of the camera body 101 according to the first exemplary embodiment. Thus, an arrangement of components of the camera body 400 will be described in more detail.

As illustrated in FIG. 24, a mount 402 is disposed on a front surface of the camera body 400, and a camera accessory such as an interchangeable lens is attachable and detachable. Further, an accessory shoe 403 is disposed at an upper portion of the camera body 400 and is a connection portion to and from which external devices, such as a flash and a microphone, are attachable and detachable. An eyepiece portion 404 is disposed on a rear surface of the camera body 400 and at an upper portion of the camera body 400.

A grip portion 419 is disposed at a right portion of the camera body 400 viewed from the rear side from which the user looks into the eyepiece portion 404 of the EVF unit 401. The user can hold the grip portion 419 with a hand. Thus, operation units that are manually operable by the user holding the camera body 400 are concentrated at the right side of the camera body 400 according to the present exemplary embodiment. For example, the release button 405 and a first operation dial 407, a second operation dial 408, a first setting button 409, and a second setting button 410 for adjusting various parameters relating to imaging conditions and modes are located at an upper right portion of the camera body 400. Further, an information display portion 406 is disposed on the right side of the EVF unit 401 (eyepiece portion 404) at an upper portion of the camera body 400 according to the present exemplary embodiment. The information display portion 406 is a display unit that can display various types of information, such as a shutter speed and an aperture value relating to exposure conditions, a current imaging mode, and information about whether continuous imaging is on.

Figure 25:
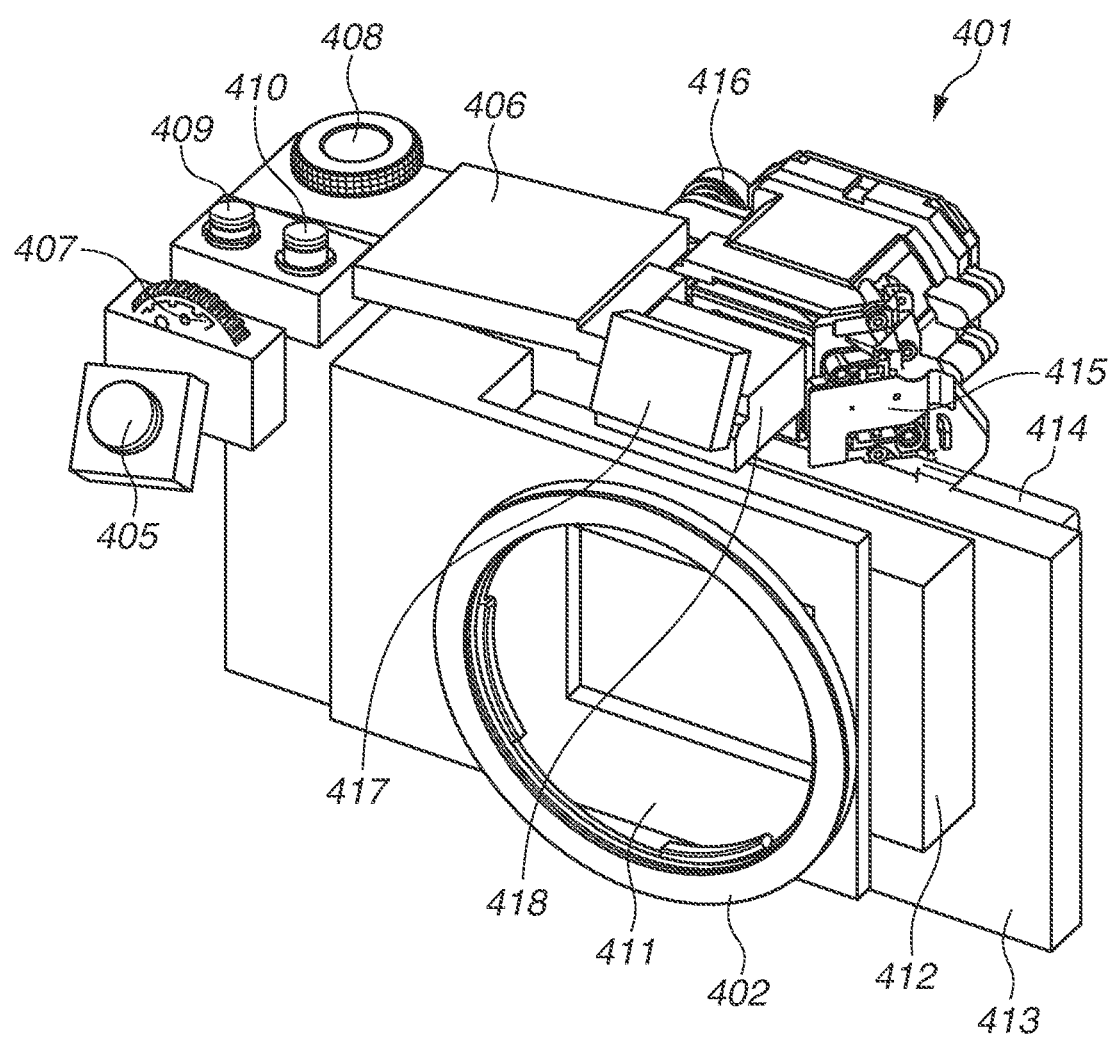
FIG. 25 is a perspective view illustratively illustrating an internal structure of the camera body 400 according to the fourth exemplary embodiment of the present invention.

FIG. 25 is a perspective view illustratively illustrating an internal structure of the camera body 400 according to the fourth exemplary embodiment of the present invention. FIG. 26 is a top external view illustratively illustrating an internal structure of the camera body 400 according to the fourth exemplary embodiment of the present invention. As illustrated in FIGS. 25 and 26, the diopter adjustment portion 416 is disposed to the right of the EVF unit 401.

As described above, the grip portion 419, the various operation units (406 to 410), and the diopter adjustment portion 416 are concentrated mainly at the right side of the camera body 400. This structure improves the operability of the camera body 400 for the user holding the camera body 400 since the most common case is a case where the user holds the camera body 400 with the right hand.

As described above, various operation units and the diopter adjustment portion 416 are concentrated at the right side of the camera body 400, so that disposing, for example, a line-of-sight detection sensor unit 415 for line-of-sight detection, at the right side of the camera body 400 may increase the size of the camera body 400. Thus, the line-of-sight detection sensor unit 415 of the EVF unit 401 according to the present exemplary embodiment is disposed at the side different from the side that is to be held by the user with respect to an optical path (or optical axis) of the EVF unit 401 in the camera body 400. Specifically, the line-of-sight detection sensor unit 415 of the EVF unit 401 is disposed at an opposite side to the side where the grip portion 419 or various operation units or the diopter adjustment portion 416 is disposed with respect to a lens unit of the EVF unit 401.

Figure 26:
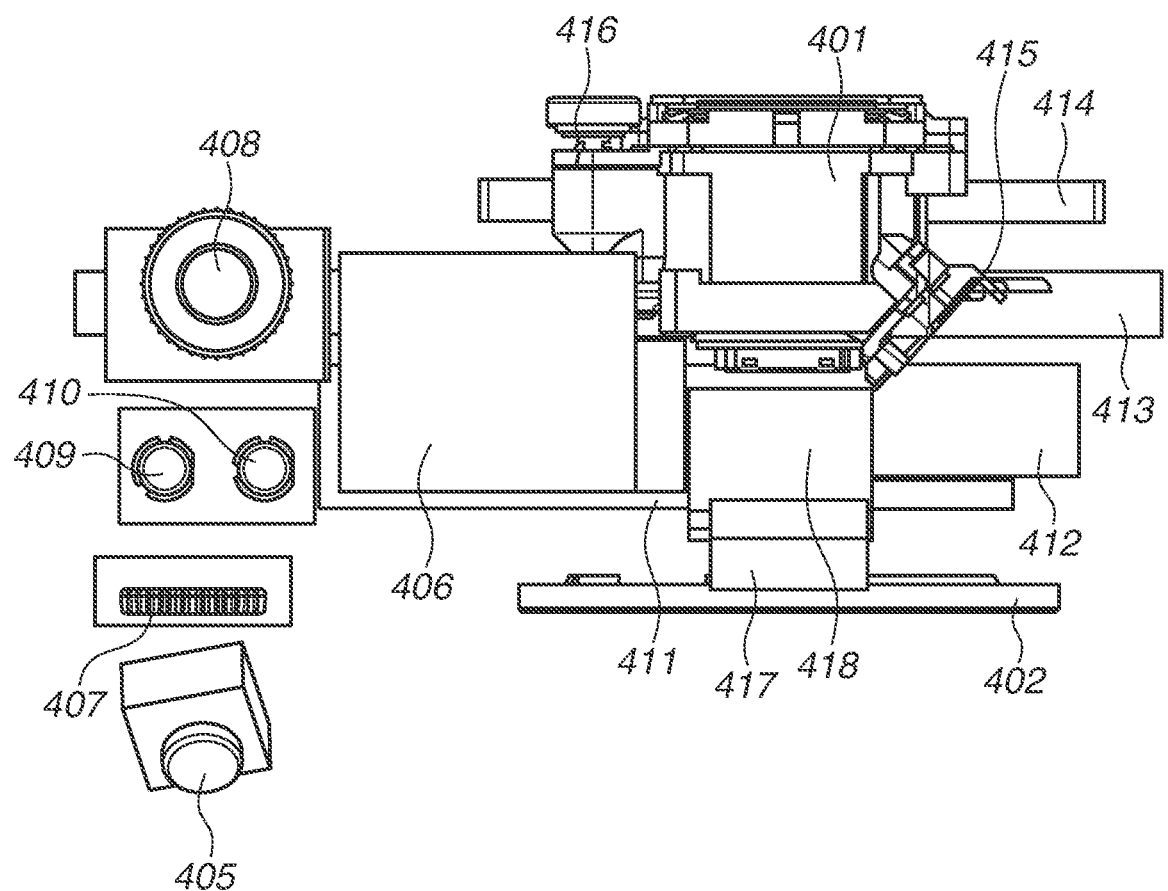
FIG. 26 is a top external view illustratively illustrating an internal structure of the camera body 400 according to the fourth exemplary embodiment of the present invention.

As illustrated in FIGS. 25 and 26, a shutter 411, an image sensor unit 412 including an image sensor, and a display monitor 414 are provided at a lower portion of the EVF unit 401 in the camera body 400. According to the present exemplary embodiment, the EVF unit 401 and the display monitor 414 are disposed to overlap on a plane (two-dimensional plane) perpendicular to an imaging optical axis of the camera body 400 in order to reduce the size and thickness of the camera body 400.

Further, it is known that disposing the finder immediately above a central axis that passes through a center of a diameter of the mount 402 and is the imaging optical axis of the camera body 400 typically reduces the strangeness the user may feel in framing a subject. Thus, according to the present exemplary embodiment, the EVF unit 401 is disposed to overlap the central axis (imaging optical axis) of the mount 402 on the plane perpendicular to the central axis. In other words, the EVF unit 401 is disposed to overlap the imaging optical axis of the camera body 400 and a lens unit attachable to and detachable from the camera body 400 on the two-dimensional plane perpendicular to the imaging optical axis of the lens unit of the EVF unit 401.

Further, a positioning unit such as a global positioning system (GPS) unit 417 of the camera body 400 and a measurement unit such as a measurement unit 418 for detecting an orientation and a movement of the camera body 400 are disposed at a front side of the EVF unit 401. Further, the accessory shoe 403 described above is disposed at an upper portion of the EVF unit 401. The foregoing units are also connected to a main substrate 413 similarly to the various operation units described above. Thus, disposing the line-of-sight detection sensor unit 415 between the units and the EVF unit 401 may lead to an increase in size of the camera body 400 and complicated wiring from the main substrate 413 to the units.

Thus, a layout of the EVF unit 401 for accommodating a line-of-sight detection mechanism while preventing an increase in size of the camera body 400 desirably avoids a grip region of the camera body 400 and a neighborhood of the grip region where other members are less likely to be disposed. For example, as described above, the line-of-sight detection sensor unit 415 is desirably disposed at the opposite side to the grip region disposed at the right side of the camera body 400 where the grip portion 419 and various operation units are disposed with respect to the optical axis of the EVF unit 401.

While various exemplary embodiments of the present invention have been described above, the present invention is not limited to the exemplary embodiments, and various modifications and changes can be made without departing from the scope of the invention. For example, while so-called interchangeable lens imaging apparatuses with a camera body to and from which a lens unit is attachable and detachable are described above in the exemplary embodiments, the present invention is not limited to those described above. For example, the lens unit and the camera body can be integrally provided.

Further, while imaging apparatuses are illustratively described as an electronic device to which the present invention is applied are described above in the exemplary embodiments, the present invention is not limited to those described above. For example, the exemplary embodiments are applicable to a device, such as a head-mount display that includes the line-of-sight detection function and performs control based on feedback from the line-of-sight detection function.

Further, while the configuration in which the CPU 111 comprehensively controls the camera body and the lens unit is described above in the exemplary embodiments, the present invention is not limited to those described above. In another configuration, for example, a (computer) program according to the flow illustrated in FIG. 20 is stored in advance in a memory unit of the camera body. Then, the components of the camera body 101 having the configuration illustrated in FIG. 2 cooperate together and execute the program to control operations of the entire imaging system.

Further, the program can be in any forms that have a program function, such as object codes, a program to be executed by an interpreter, or script data to be fed to an operating system (OS). Further, a recording medium for feeding the program can be, for example, a hard disk, a magnetic recording medium such as a magnetic tape, or an optical or magneto-optical recording medium.

Other Exemplary Embodiments

Further, the present invention is also realizable by the following process. Specifically, a program for realizing one or more functions of the above-described exemplary embodiments is fed to a system or an apparatus via a network or a storage medium, and one or more processors of a computer of the system or the apparatus read the program and execute the read program. Further, the present invention is also realizable by a circuit (e.g., application-specific integrated circuit (ASIC)) for realizing one or more functions.

The present invention is not limited to the above-described exemplary embodiments, and various changes and modifications can be made without departing from the spirit and scope of the present invention. Therefore, the claims below are attached to state the scope of the present invention.

The present invention prevents a decrease in operability of an imaging apparatus including an electronic viewfinder (EVF) and a line-of-sight input function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus that includes a first sensor configured to image an optical subject image incident via a first lens unit, the imaging apparatus comprising:
    a display panel;
    an eyepiece portion;
    a second sensor that is different from the first sensor and is configured to image an eye of a user viewing the display panel by looking into the eyepiece portion;
    an optical path split unit configured to guide light from the display panel to outside of the imaging apparatus and to guide external light to the second sensor;
    a second lens unit disposed between the optical path split unit and the eyepiece portion, and
    a diopter adjustment portion for adjusting a diopter by moving the second lens unit,
    wherein a grip region of the imaging apparatus is located at a side where the diopter adjustment portion is disposed with respect to an optical axis of the second lens unit,
    wherein the second sensor is disposed at a different side that is different from a side where the grip region of the imaging apparatus is disposed with respect to the optical axis of the second lens unit, and
    wherein the second sensor is disposed at an opposite side that is opposite to the side where the diopter adjustment portion is disposed with respect to the optical axis of the second lens unit.

2. The imaging apparatus according to claim 1, further comprising a grip portion configured to be gripped by the user in gripping the imaging apparatus, wherein the grip region of the imaging apparatus includes the grip portion.

3. The imaging apparatus according to claim 1, further comprising an operation unit configured to be operated manually by the user in a state where the imaging apparatus is gripped,
wherein the grip region of the imaging apparatus is located at a side where the operation unit is disposed with respect to the optical axis of the second lens unit, and
wherein the second sensor is disposed at an opposite side that is opposite to the side where the operation unit is disposed with respect to the optical axis of the second lens unit.

4. The imaging apparatus according to claim 3, wherein the operation unit includes a release button for issuing an instruction to start imaging.

5. The imaging apparatus according to claim 3, wherein the operation unit includes an operation dial or a setting button for adjusting an imaging condition.

6. The imaging apparatus according to claim 1, further comprising:
an image sensor unit including the first sensor;
a display monitor that is different from the display panel and is configured to display image data acquired using the first sensor; and
a substrate connected to the image sensor unit and the display monitor,
wherein a finder unit including at least the display panel, the second sensor, the optical path split unit, and the second lens unit overlaps at least one of the image sensor unit, the display monitor, and the substrate on a two-dimensional plane perpendicular to the optical axis of the second lens unit.

7. The imaging apparatus according to claim 6, wherein the finder unit overlaps an imaging optical axis of the first lens unit on the two-dimensional plane perpendicular to the optical axis of the second lens unit.

8. An electronic device that includes a display panel and has a line-of-sight detection function to detect a line of sight of a user viewing a display on the display panel, the electronic device comprising:
a display unit, wherein the display unit includes the display panel and a frame holding the display panel;
a line-of-sight detection sensor configured to receive light from a pupil of the user; and
an optical path split unit configured to guide light from the display panel to outside and to guide external light to the line-of-sight detection sensor,
wherein the optical path split unit is fixed to the display unit to be integrally formed with the display unit.

9. The electronic device according to claim 8, further comprising a lens unit configured to guide light from the outside to the optical path split unit.

10. The electronic device according to claim 8, further comprising a light source configured to emit light for detecting the line of sight of the user to the outside.

11. The electronic device according to claim 10,
wherein the light from the light source includes infrared light, and
wherein the line-of-sight detection sensor receives reflected infrared light from the outside.

12. The electronic device according to claim 8, further comprising a detection unit configured to detect the line of sight of the user based on a signal from the line-of-sight detection sensor.

13. A finder unit comprising:
a display panel;
a sensor configured to image an eye of a user viewing the display panel;
an optical path split unit configured to guide light from the display panel to outside and to guide external light to the sensor;
a lens unit disposed at a position facing the optical path split unit;
an optical member located between the lens unit and the eye of the user viewing the display panel;
an illumination unit configured to emit infrared wavelength light toward an opposite side across the optical member, wherein the illumination unit is located between the optical member and the lens unit in a direction parallel to an optical axis of the lens unit;
a mask having a transmittance in visible wavelength light and a transmittance in infrared wavelength light, wherein the transmittance in visible wavelength light is lower than the transmittance in infrared wavelength light in the direction parallel to the optical axis of the lens unit;
a proximity detection unit configured to detect an approach of an object; and
a diopter adjustment unit configured to adjust a diopter by moving the lens unit,
wherein the mask is disposed at a position that is different from an optical path that is from the display panel to the optical member and is closer to the user than the illumination unit when the user views the display panel,
wherein the illumination unit is disposed at a position along a long side and the proximity detection unit and the diopter adjustment unit are disposed at a position along a short side with respect to the optical path that is from the display panel to the optical member, and
wherein the proximity detection unit is located at an opposite side to a side where the diopter adjustment unit is located with respect to the optical axis of the lens unit.

14. The finder unit according to claim 13, wherein the mask and the optical member are integrally provided, and the mask is a printed material printed with a material configured to transmit infrared wavelength light.

15. The finder unit according to claim 13, further comprising a line-of-sight detection unit,
wherein the sensor images an optical image in a case where the infrared wavelength light emitted from the illumination unit is reflected by the eye of the user, and
wherein the line-of-sight detection unit detects a line of sight of the user based on image data corresponding to the optical image imaged by the sensor.

16. The finder unit according to claim 13,
wherein the proximity detection unit includes a second illumination unit that is different from the illumination unit, and
wherein a light emission direction of the second illumination unit is inclined with respect to the optical member toward the optical axis of the lens unit.

* * * * *